United States Patent
Lytkin et al.

(10) Patent No.: US 10,489,468 B2
(45) Date of Patent: Nov. 26, 2019

(54) SIMILARITY SEARCH USING PROGRESSIVE INNER PRODUCTS AND BOUNDS

(71) Applicant: Facebook, Inc., Menlo Park, CA (US)

(72) Inventors: Nikita Igorevych Lytkin, Sunnyvale, CA (US); Matthys Douze, Montreuil (FR)

(73) Assignee: Facebook, Inc., Menlo Park, CA (US)

( * ) Notice: Subject to any disclaimer, the term of this patent is extended or adjusted under 35 U.S.C. 154(b) by 126 days.

(21) Appl. No.: 15/683,488

(22) Filed: Aug. 22, 2017

(65) Prior Publication Data
US 2019/0065594 A1  Feb. 28, 2019

(51) Int. Cl.
G06F 16/20 (2019.01)
G06F 16/951 (2019.01)
G06F 16/2455 (2019.01)

(52) U.S. Cl.
CPC ...... *G06F 16/951* (2019.01); *G06F 16/24553* (2019.01)

(58) Field of Classification Search
None
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,797,635 B1 | 9/2010 | Denise |
| 7,836,044 B2 | 11/2010 | Kamvar |
| 7,840,589 B1 | 11/2010 | Holt |
| 8,024,328 B2 | 9/2011 | Dolin |
| 8,027,990 B1 | 9/2011 | Mysen |
| 8,055,673 B2 | 11/2011 | Churchill |

(Continued)

OTHER PUBLICATIONS

U.S. Appl. No. 15/393,926, filed Dec. 29, 2016, Douze.
Anthony Bourrier et al., "Explicit Embeddings for Nearest Neighbor Search with Mercer Kernels", Feb. 17, 2015.

*Primary Examiner* — Belix M Ortiz Ditren
(74) *Attorney, Agent, or Firm* — Baker Botts L.L.P.

(57) ABSTRACT

In one embodiment, a method includes receiving a query and determining a query vector. The method includes accessing multiple object vectors representing multiple objects, respectively. The method includes, for a first set of object vectors identified as top object vectors, calculating an inner product with the query vector. The method includes progressively computing an inner product of the query vector and each remaining object vector and sending, to a user, the objects corresponding to the top object vectors. Progressively computing an inner product includes checking whether to calculate a first partial inner product based on a bound on the inner product and the minimum inner product for a top object vector, calculating subsequent partial inner products until the inner product is complete, and substituting the object vector for a top object vector if the complete inner product is greater than the minimum inner product.

20 Claims, 10 Drawing Sheets

(56) References Cited

U.S. PATENT DOCUMENTS

| | | |
|---|---|---|
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,209,330 B1 | 6/2012 | Covell |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0178158 A1* | 11/2002 | Kanno .................. G06F 16/338 |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0218111 A1 | 9/2006 | Cohen |
| 2007/0174304 A1 | 7/2007 | Shrufi |
| 2007/0192293 A1 | 8/2007 | Swen |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0222348 A1 | 9/2009 | Ransom |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0271374 A1 | 10/2009 | Korn |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0250526 A1 | 9/2010 | Prochazka |
| 2010/0321399 A1 | 12/2010 | Ellren |
| 2011/0004609 A1 | 1/2011 | Chitiveli |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |

(56) References Cited

U.S. PATENT DOCUMENTS

| | | |
|---|---|---|
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0067535 A1 | 3/2014 | Rezaei |
| 2014/0122465 A1 | 5/2014 | Bilinski |
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0085783 A1* | 3/2016 | Cevahir ............... G06F 16/35 707/738 |
| 2016/0162502 A1 | 6/2016 | Zhou |
| 2016/0203238 A1 | 7/2016 | Cherniavskii |
| 2017/0083523 A1 | 3/2017 | Philip |
| 2018/0068023 A1* | 3/2018 | Douze ............... G06F 16/9535 |

* cited by examiner

SIMILARITY SEARCH USING PROGRESSIVE INNER PRODUCTS AND BOUNDS

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may receive a query associated with a user and respond to the query by providing one or more objects to the client system of the user. The social-networking system may determine the one or more objects to provide to the user by comparing a vector representation of the query to a plurality of vector representations of a plurality of objects, respectively. Using vector representations of the query and the plurality of objects may allow the social-networking system to efficiently compare objects to identify the closest match to a query by enabling the social-networking system to apply efficient, uniform approaches for comparing vectors, regardless of the type of object represented by each vector of the plurality of vectors. In particular embodiments, the social-networking system may calculate the inner product of the query vector and each object vector to identify one or more object vectors representing one or more respective objects that are the closest match to the query. The plurality of object vectors may correspond to an embedding space and the social-networking system may use the inner product to calculate a distance measure between the query vector and each object vector. To further optimize the comparison of the objects to the query, the social-networking system may calculate a bound on the inner product of the query vector and each object vector to determine whether to calculate the full inner product. The social-networking system may calculate the inner product progressively by calculating one or more partial inner products and updating a bound on the complete inner product, terminating the computation if the updated bound indicates the value of the inner product will not satisfy a reference value. Once each object vector of the plurality of object vectors has been evaluated, a threshold number of the objects with the highest similarity to the query may be be sent to the client system of the querying user.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
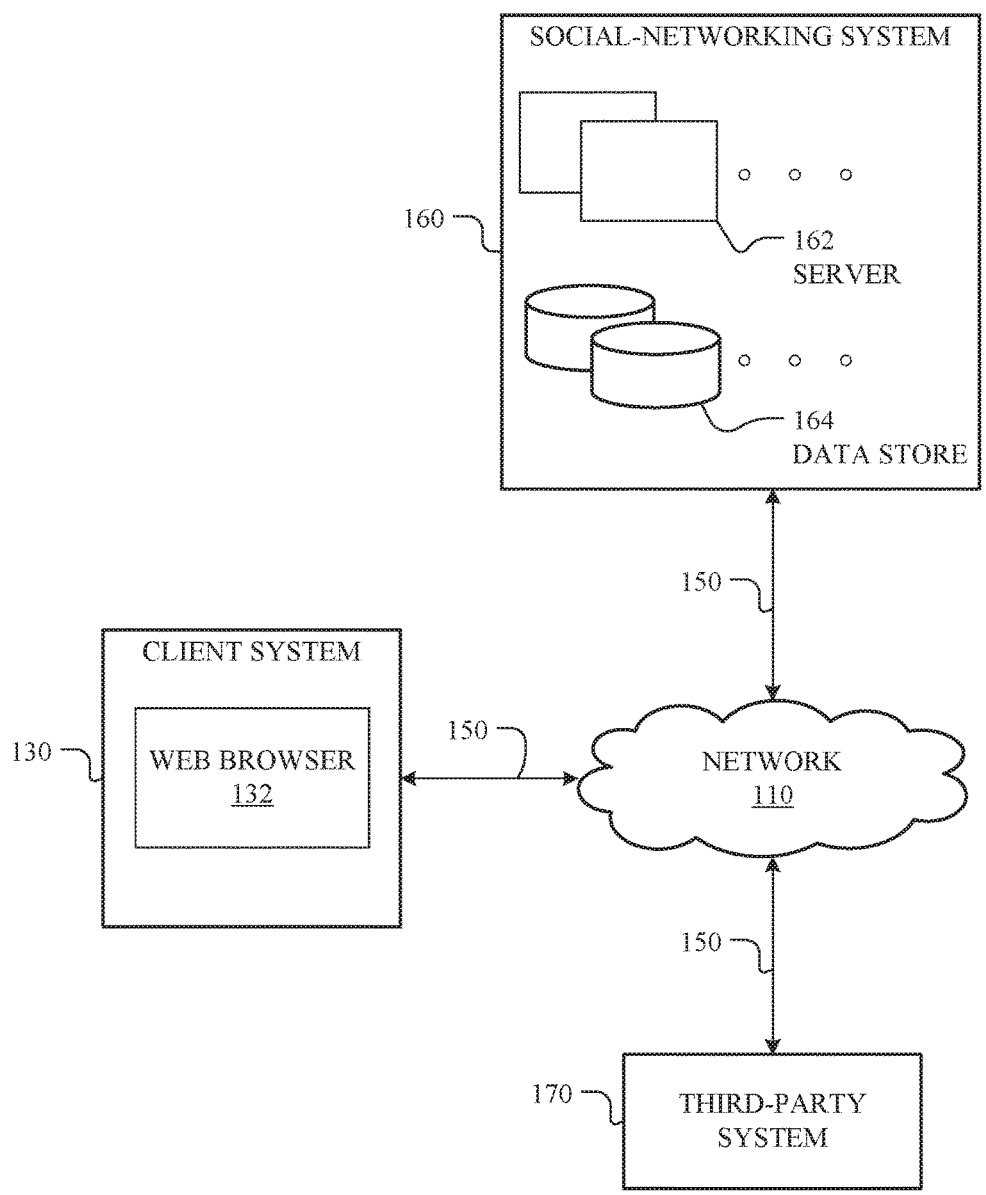
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
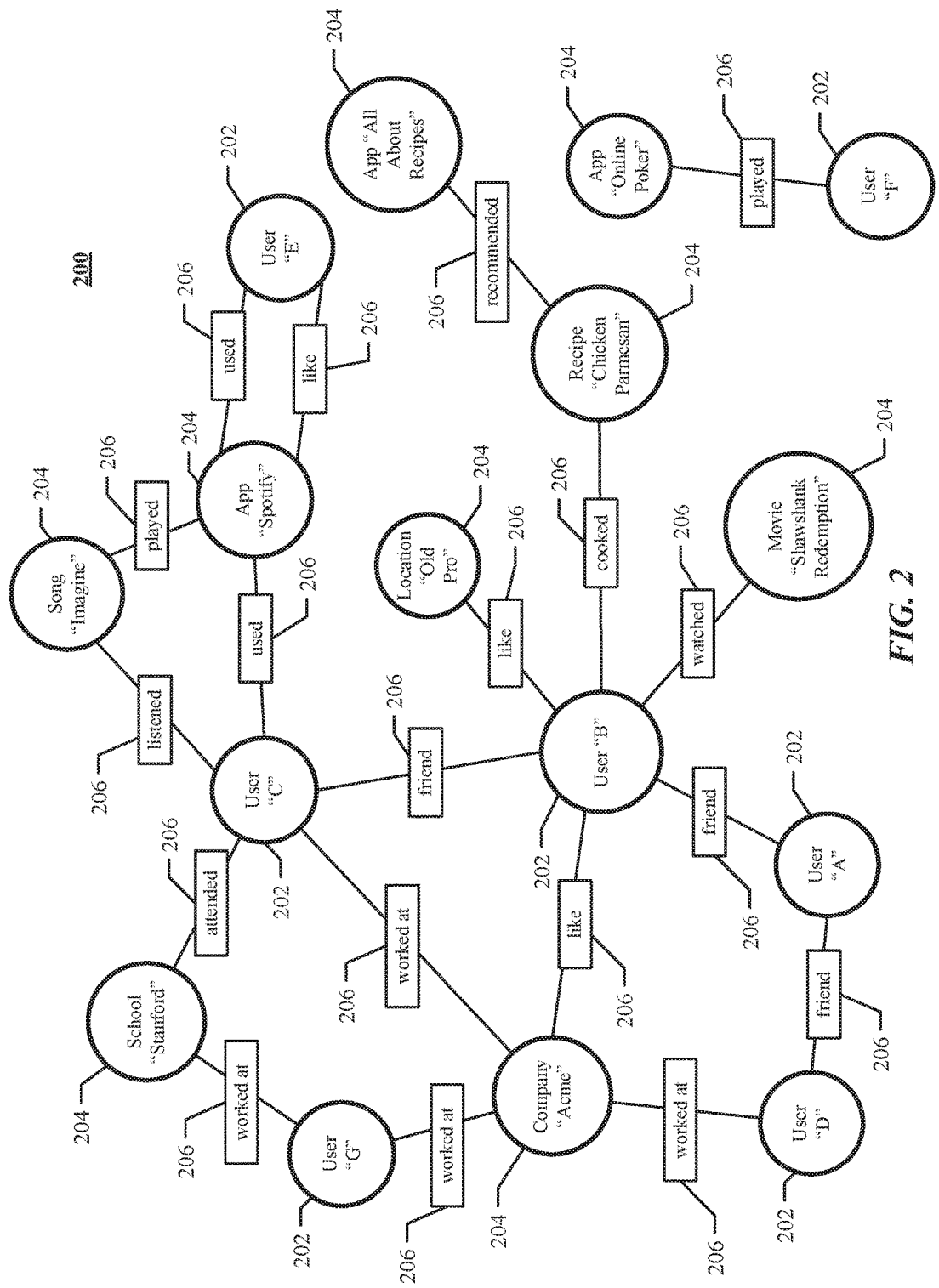
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, the social-networking system 160 may receive, from a client system of a user of an online social network, a query inputted by the user. The user may submit the query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Indexing Based on Object-Type

Figure 3:
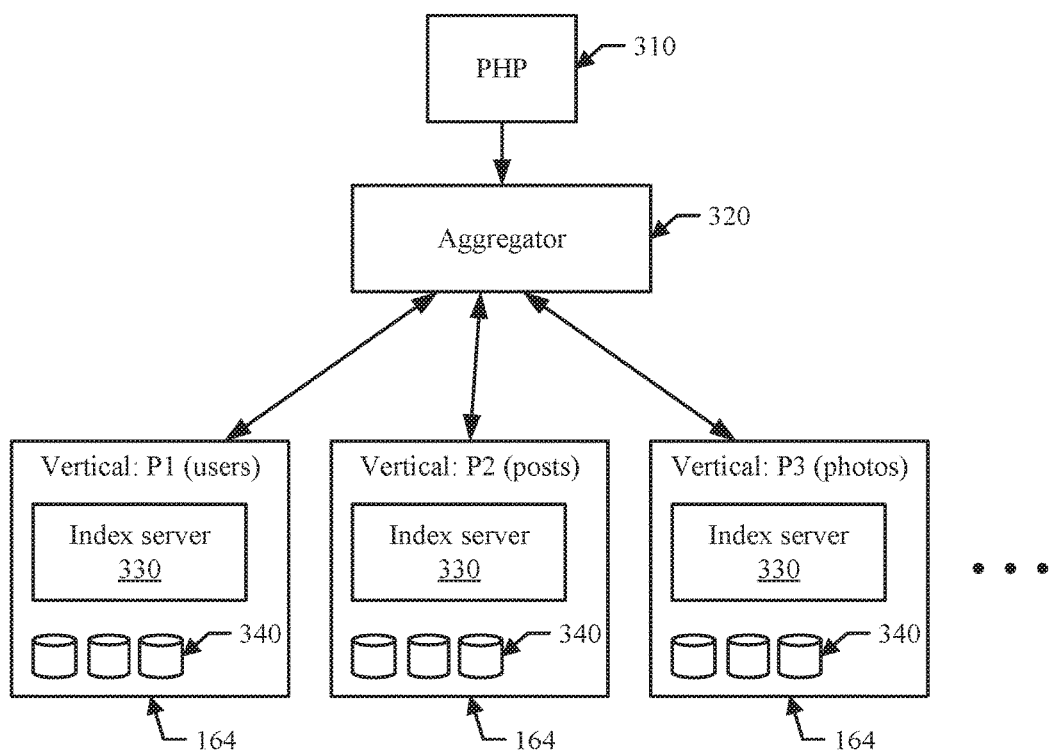
FIG. 3 illustrates an example partitioning for storing objects of a social-networking system.

FIG. 3 illustrates an example partitioning for storing objects of a social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. An object-type may be, for example, a user, a photo, a post, a comment, a message, an event listing, a web interface, an application, a location, a user-profile interface, a concept-profile interface, a user group, an audio file, a video, an offer/coupon, or another suitable type of object. Although this disclosure describes particular types of objects, this disclosure contemplates any suitable types of objects. As an example and not by way of limitation, a user vertical P1 illustrated in FIG. 3 may store user objects. Each user object stored in the user vertical P1 may comprise an identifier (e.g., a character string), a user name, and a profile picture for a user of the online social network. Social-networking system 160 may also store in the user vertical P1 information associated with a user object such as language, location, education, contact information, interests, relationship status, a list of friends/contacts, a list of family members, privacy settings, and so on. As an example and not by way of limitation, a post vertical P2 illustrated in FIG. 3 may store post objects. Each post object stored in the post vertical P2 may comprise an identifier, a text string for a post posted to social-networking system 160. Social-networking system 160 may also store in the post vertical P2 information associated with a post object such as a time stamp, an author, privacy settings, users who like the post, a count of likes, comments, a count of comments, location, and so on. As an example and not by way of limitation, a photo vertical P3 may store photo objects (or objects of other media types such as video or audio). Each photo object stored in the photo vertical P3 may comprise an identifier and a photo. Social-networking system 160 may also store in the photo vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term, and access and retrieve search results from one or more search indices corresponding to the search term. In some embodiments, a vertical corresponding to a particular object-type may comprise a plurality of physical or logical partitions, each comprising respective search indices.

In particular embodiments, social-networking system 160 may receive a search query from a PHP (Hypertext Preprocessor) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, an aggregator 320 may be configured to receive the search query from PHP process 310 and distribute the search query to each vertical. The aggregator may comprise one or more computing processes (or programs) hosted by one or more computing devices (e.g. servers) of the social-networking system 160. Particular embodiments may maintain the plurality of verticals 164 as illustrated in FIG. 3. Each of the verticals 164 may be configured to store a single type of object indexed by a search index as described earlier. In particular embodiments, the aggregator 320 may receive a search request. For example, the aggregator 320 may receive a search request from a PHP (Hypertext Preprocessor) process 210 illustrated in FIG. 2. In particular embodiments, the search request may comprise a text string. The search request may be a structured or substantially unstructured text string submitted by a user via a PHP process. The search request may also be structured or a substantially unstructured text string received from another process of the social-networking system. In particular embodiments, the aggregator 320 may determine one or more search queries based on the received search request. In particular embodiments, each of the search queries may have a single object type for its expected results (i.e., a single result-type). In particular embodiments, the aggregator 320 may, for each of the search queries, access and retrieve search query results from at least one of the verticals 164, wherein the at least one vertical 164 is configured to store objects of the object type of the search query (i.e., the result-type of the search query). In particular embodiments, the aggregator 320 may aggregate search query results of the respective search queries. For example, the aggregator 320 may submit a search query to a particular vertical and access index server 330 of the vertical, causing index server 330 to return results for the search query.

More information on indexes and search queries may be found in U.S. patent application Ser. No. 13/560,212, filed 27 Jul. 2012, U.S. patent application Ser. No. 13/560,901, filed 27 Jul. 2012, U.S. patent application Ser. No. 13/723, 861, filed 21 Dec. 2012, and U.S. patent application Ser. No. 13/870,113, filed 25 Apr. 2013, each of which is incorporated by reference.

Vector Spaces and Embeddings

Figure 4:
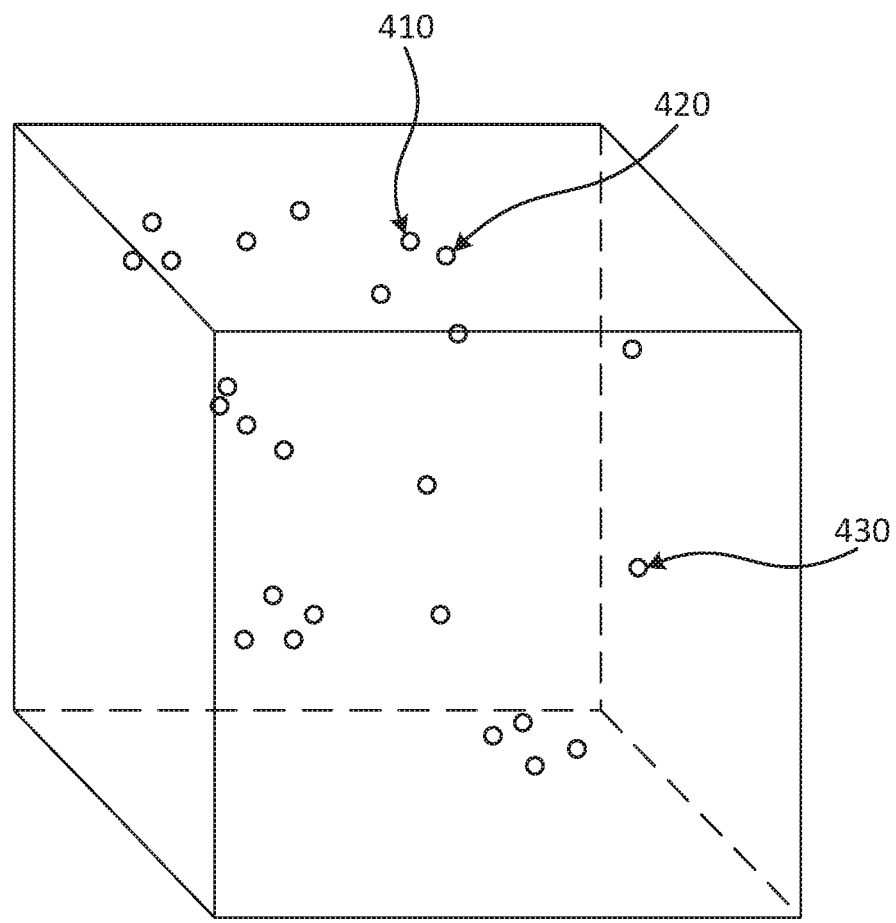
FIG. 4 illustrates an example view of an embedding space.

FIG. 4 illustrates an example view of a vector space 400. In particular embodiments, an object or an n-gram may be represented in a dimensional vector space, where denotes any suitable number of dimensions. Although the vector space 400 is illustrated as a three-dimensional space, this is for illustrative purposes only, as the vector space 400 may be of any suitable dimension. In particular embodiments, an n-gram may be represented in the vector space 400 as a vector referred to as a term embedding. Each vector may comprise coordinates corresponding to a particular point in the vector space 400 (i.e., the terminal point of the vector). As an example and not by way of limitation, vectors 410, 420, and 430 may be represented as points in the vector space 400, as illustrated in FIG. 4. An n-gram may be mapped to a respective vector representation. As an example and not by way of limitation, n-grams and may be mapped to vectors and in the vector space 400, respectively, by applying a function defined by a dictionary, such that and. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 400. In particular embodiments, an n-gram may be mapped to a vector representation in the vector space 400 by using a machine leaning model (e.g., a neural network). The machine learning model may have been trained using a sequence of training data (e.g., a corpus of objects each comprising n-grams).

In particular embodiments, an object may be represented in the vector space 400 as a vector referred to as a feature vector or an object embedding. As an example and not by way of limitation, objects and may be mapped to vectors and in the vector space 400, respectively, by applying a function, such that and. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function may map the object to a vector using a transformed reduced set of features (e.g., feature selection). In particular embodiments, a function may map an object to a vector based on one or more n-grams associated with object. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 400. A similarity metric may be a cosine similarity, a Minkowski distance, a Mahalanobis distance, a Jaccard similarity coefficient, or any suitable similarity metric. As an example and not by way of limitation, a similarity metric of and may be a cosine similarity. As another example and not by way of limitation, a similarity metric of and may be a Euclidean distance A similarity metric of two vectors may represent how similar the two objects or n-grams corresponding to the two vectors, respectively, are to one another, as measured by the distance between the two vectors in the vector space 400. As an example and not by way of limitation, vector 410 and vector 420 may correspond to objects that are more similar to one another than the objects corresponding to vector 410 and vector 430, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Speeding Up Retrieval of Objects Against a Database of Vectors

In particular embodiments, the social-networking system 160 may receive a query associated with a user and respond to the query by providing one or more objects to the client system 130 of the user. The social-networking system 160 may determine the one or more objects to provide to the user by comparing a vector representation of the query to a plurality of vector representations of a plurality of objects, respectively. Using vector representations of the query and the plurality of objects may allow the social-networking system 160 to efficiently compare objects to identify the closest match to a query by enabling the social-networking system 160 to apply efficient, uniform approaches for comparing vectors, regardless of the type of object represented by each vector of the plurality of vectors. A vector representation of a query or an object may embed information about the query or object and allow for a direct comparison of the two. Because the vector representations correspond to embeddings of the query and the objects, the closest-matching objects may correspond to the closest object vector representations in the embedding space to the query vector representation. The search for the closest match to the query may therefore be treated as a nearest-neighbor search of the embedding space. The social-networking system 160 may calculate the distance between the query vector representation and an object vector representation by calculating the inner product of the two vectors. To optimize the comparison of the objects to the query, the social-networking system 160 may calculate a bound on an inner product of the query vector representation and an object vector representation and use the bound to determine whether to calculate the inner product. The social-networking system 160 may further optimize the comparison by calculating the inner product progressively using an updating bound procedure. Once all of the object vectors have been evaluated, a threshold number of objects with the highest similarity to the query, as determined based on the respective inner products, may be sent to the client system 130 of the querying user.

The social-networking system 160 may receive a query and determine a vector representation of the query (i.e., a "query vector"). The social-networking system 160 may access a plurality of vectors representing a plurality of objects (i.e., "object vectors") that are potential matches to the query. To determine which objects to send to the user, the social-networking system 160 may compare each of the object vectors to the query vector, and compare the relative similarities of each of the object vectors. A vector comparison may be in the form of calculating a distance measure between the two vectors. One technique for such a comparison is to calculate an inner product of the two vectors. An inner product is a function of two vectors that "multiplies" the vectors, with the result being a scalar value. As an example and not by way of limitation, one inner product is the dot product. The inner product of two vectors, $q, v \in \mathbb{R}^d$ (i.e., having d dimensions or components), written $\langle q|v \rangle$, using the dot product $q \cdot v$ is defined as $\langle q|v \rangle = q^T v = \sum_{i=1}^{d} q_i v_i$, the sum of the products of each component of each vectors. While specific inner product functions are used as examples herein, the techniques as described may be applicable to other inner product functions. The inner product is a relatively quick method to compare a single query vector and a single object vector. However, to determine the best matches among a plurality of n objects, the social-networking system 160 must calculate the inner product of each of the query vector and the plurality of n object vectors and compare these inner products to each other. Each additional object accessed increases the cost to provide a response to a query. This complexity also increases as the dimensionality (i.e., the number of components) of each vector increases. For example, to represent complex media objects, vectors of one thousand dimensions/components or more may be used. To respond to a single query referencing a database of one million objects may require more than one billion multiplications just to calculate the dot products. In an environment with billions of users, each making hundreds of queries each day, the computational cost of performing these retrieval operations can be incredibly high. Therefore, techniques to reduce the number of comparisons needed would be advantageous improvements to content-retrieval systems. These techniques may be particularly useful in high-throughput, low-latency database environments such as in advertising, search, or content recommendation. These techniques may also be useful in any environment where a vector query is made against a database comprising vectors. As an example, and not by way of limitation, the query may be an advertising request sent by a client system 130 of a user and the objects may be advertisements. The advertising request may embed information about the user's demographics and previous advertising-related behavior. To determine the best advertisements to display to the user, the social-networking system 160 may compare the entire corpus of objects to the query, and compare the relative similarities of the respective objects. Depending on the number of objects in the corpus and the number of possible dimensions of similarity, this could be a computationally expensive and time-consuming task. The techniques described herein may reduce the time and computational cost needed to respond to the query without reducing the quality of results. Although this disclosure describes retrieving results to a query particular manner, this disclosure contemplates retrieving results to a query in any suitable manner.

In particular embodiments, the social-networking system 160 may receive a query associated with a user. The query may be received from a client system 130 associated with the user. The query may be associated with a query type. The social-networking system 160 may determine the query type based on contextual information included with or embedded within the query. The contextual information may allow the social-networking system 160 to retrieve objects in a personalized manner for the user. The social-networking system 160 may determine the objects to be retrieved based on the type of the query. In particular embodiments, the query may be a search query received from the user and the plurality of n objects may be n search results matching the search query, respectively. A user may enter a search query comprising one or more n-grams into a search field of the online social network. The search field may be associated with a particular object-type. Contextual information may indicate, for example, a number of search results to retrieve, a social context of the page on which the search field is located, information about the client system 130, other suitable information, or any combination thereof. The social-networking system 160 may receive the search query as the query associated with the user. The social-networking system 160 may determine which data stores to search for objects, a number of objects to retrieve, or any other suitable related information, based on the query. As an example and not by way of limitation, a user may enter the search query "Thomas Smith photos" into a search field. The social-networking system 160 may receive the search query along with information indicating that the user is on a particular type of mobile device (e.g., an iPhone 7). The social-networking system 160 may search a data store 164 holding digital images (e.g., the photo vertical P3) and access images associated with friends of the user. Although this disclosure describes receiving a query in a particular manner, this disclosure contemplates receiving a query in any suitable manner.

In particular embodiments a user may request to access a communication channel of the online social network. The social-networking system 160 may receive a content-recommendation request associated with the user. The plurality of n objects may be n recommended content objects receivable by the user through the communication channel. A communication channel may refer to, for example, a newsfeed, a profile page, a streaming media feed, a product marketplace, a trending topics feed, a messaging protocol, or any other type of access point through which a user may receive information. The communication channel may be accessed via an Application Programming Interface (API). With the access request, the social-networking system 160 may receive a content-recommendation request. The content-recommendation request may include information indicating a context of the request, the types of content requested, the number or size of content objects requested, information about the client system 130, other suitable information, or any combination thereof. The social-networking system 160 may provide the content objects to the user as recommended content. The strength of the recommendation of each content object may correspond to a degree of similarity or relevancy between the respective object and the query. As an example and not by way of limitation, the user may request to access a newsfeed section of the online social network. The social-networking system 160 may receive the access request and associated content-recommendation request. The content-recommendation request may be sent with context information indicating that the user is on a desktop system with LAN-based internet access. The social-networking system 160 may use this information to access one or more data stores 164 containing high-quality digital media and retrieve objects relevant to the user based on social networking information and trending topics. Although this disclosure describes receiving a query in a particular manner, this disclosure contemplates receiving a query in any suitable manner.

In particular embodiments, the query may be an advertising request associated with the user and the plurality of n objects may be n recommended advertisements receivable by the user at a client system 130 of the user. When a user accesses a page of the online social network, or accesses a webpage through an application on a client system 130 of the user provided by the online social network, the social-networking system 160 may receive an advertising request. The advertising request may be generated by the client system 130. The advertising request may be generated by an advertising server after detecting that the user has accessed a page of the online social network, or accessed a webpage through an application on a client system 130. The advertising request may be associated with the user and provide information about the user or client system 130, contextual information about the page or webpage being accessed such as associated advertising campaigns, other suitable information or any combination thereof. The social-networking system 160 may determine advertisements to serve to the user based on the advertising request. As an example and not by way of limitation, the user may access a third-party webpage using an application on the client system 130 provided by the online social network. The social-networking system 160 may receive an advertising request. The advertising request may include information about the webpage, such as relevant keywords, information about target advertisements, such as the size of the advertisements and whether they should be text, image, or video based, and information about the user, such as the user's relevant demographics and interests. Based on the received advertising request and the contextual information, the social-networking system 160 may access a data store 164 holding video-based advertisements that have been directed towards males aged 25-30 whose interests include live concerts and online streaming. Although this disclosure describes receiving a query in a particular manner, this disclosure contemplates receiving a query in any suitable manner.

In particular embodiments, the social-networking system 160 may access a plurality of n object vectors representing a plurality of n objects, respectively. In particular embodiments, the social-networking system 160 may access a plurality of n object vectors by identifying a plurality of n objects matching the query and retrieving a plurality of n object vectors corresponding to the plurality of n objects, respectively. The social-networking system 160 may receive the query and identify a plurality of objects from one or more data stores 164 using any suitable techniques. Accessing the plurality of objects may comprise performing an initial retrieval wherein all objects relevant, relating, or possibly matching to the query are retrieved. The techniques described herein may then be used to optimize the determination of which of these relevant objects are shown to the user. The plurality of n objects may comprise one or more of a digital media item, an application, an event, a location, a profile page, an advertisement, or an external webpage. Depending on the type of the query, the social-networking system 160 may determine one or more types of objects to return to the user. The social-networking system 160 may access one or more data stores 164 holding object vectors corresponding to objects of the one or more data types. In particular embodiments, the data stores 164 may be configured to store a single type of object (e.g., a image data store, a video data store, an application data store, an event data store, etc., as illustrated in FIG. 3). In particular embodiments, a data store 164 may store a plurality of types of objects, each data store 164 being configured to be accessible in response to particular types of queries (e.g., a search data store, a content recommendation data store, an advertising data store, etc.). The object vectors in the data store 164 may be stored in association with their corresponding objects. The object vectors in the data store 164 may be stored with references to their corresponding objects. As an example and not by way of limitation, the social-networking system 160 may receive a query from the client system 130 of a user and determine the query to be an advertising request. The social-networking system 160 may access a data store 164 holding advertisements from currently active advertising campaigns, object vector representations of each advertisement, and other relevant data. The social-networking system 160 may filter the advertisements based on context data associated with the request. The social-networking system 160 may access the object vectors associated with the respective advertisements remaining after the filtering. Although this disclosure describes accessing a collection of vectors in a particular manner, this disclosure contemplates accessing a collection of vectors in any suitable manner.

Figure 5:
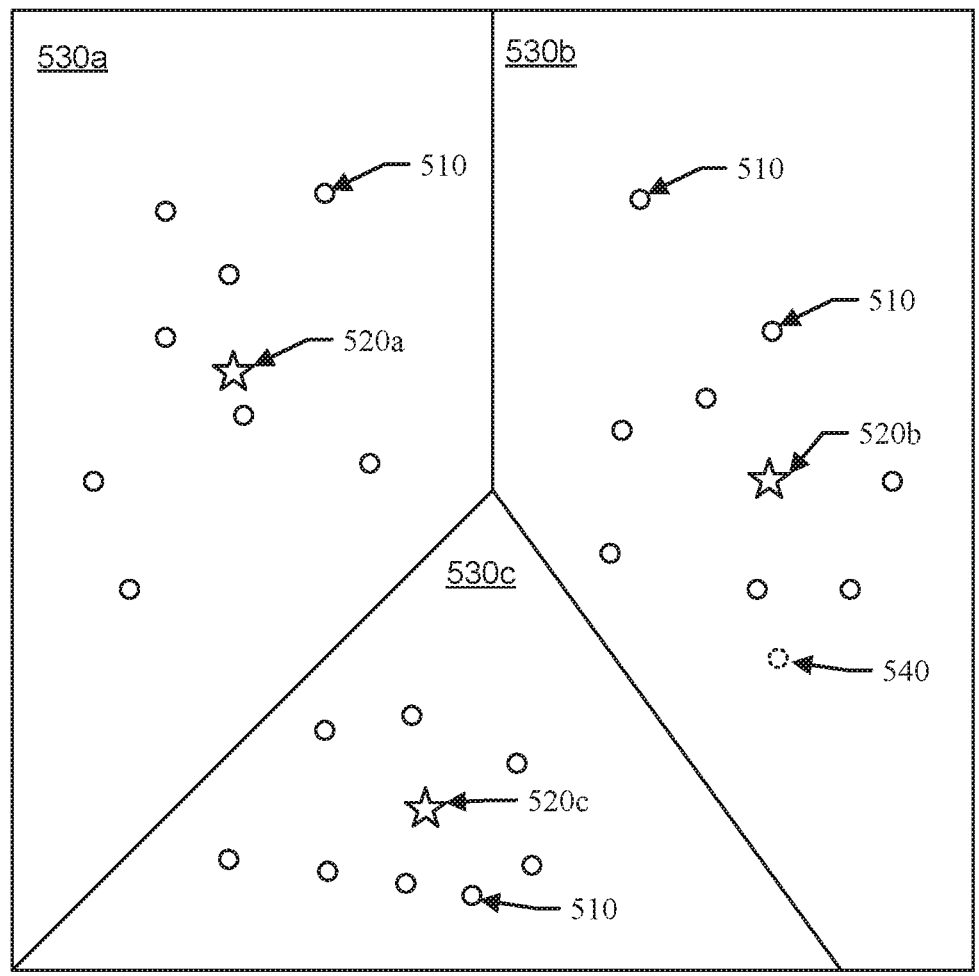
FIG. 5 illustrates an example view of a clustered space.

In particular embodiments, the social-networking system 160 may access a plurality of n object vectors representing a plurality of n objects by accessing the object vectors within one or more partitions of an embedding space corresponding to the object vectors in a data store 164. In particular embodiments, the social-networking system 160 may partition the plurality of n object vectors into a plurality of disjoint sets, each set being represented by a centroid vector. The social-networking system 160 may partition the object vectors into disjoint sets. Each object vector may belong to a single set. In the particular embodiments, the centroid vector for a set of object vectors may be calculated based on the statistical properties of the set of vectors. For example, the centroid vector may be a mean or median vector of the set of vectors. FIG. 5 illustrates a plurality of object vectors represented in a two-dimensional vector embedding space 500 partitioned into a number of disjoint sets. The embedding space 500 comprises a plurality of object vectors 510, each belonging to a set. Each set of object vectors coincides with a partition 530a, 530b, or 530c of the vector embedding space 500. The embedding space 500 further comprises a plurality of centroid vectors 520a, 520b, and 520c. Each centroid vector 520a, 520b, and 520c corresponds to a respective partition 530a, 530b, and 530c of the vector embedding space 500. Each centroid vector 520a, 520b, and 520c is the mean of the object vectors within the respective partition 530a, 530b, 530c. The sets of object vectors may be determined by grouping the object vectors such that each object vector is grouped with the other closest object vectors, the object vectors having the least distance to the particular object vector. In particular embodiments, the distance between object vectors in an embedding space may be calculated by an inner product. The centroid vectors 520a, 520b, and 520c may be chosen such that each object vector within a set is closer to the centroid vector representing that set than any other centroid vector. In particular embodiments, the partitioning of the embedding space and calculation of the centroid vectors may be performed by a partitioning component of the social-networking system 160 as each object, and corresponding object vector, is added to a data store 164. Partitioning the object vectors prior to accessing the vectors may improve object retrieval time. In particular embodiments, the partitioning and calculating of the centroid vectors may be performed subsequent to receiving the query. Although this disclosure describes partitioning of vectors in a particular manner, this disclosure contemplates partitioning vectors in any suitable manner.

In particular embodiments, the social-networking system 160 may access a plurality of n object vectors representing a plurality of n objects by accessing the object vectors 510 within one or more partitions 530. The social-networking system 160 may determine one or more centroid vectors of the plurality of centroid vectors having an inner product with the query vector satisfying a threshold value and identify the object vectors belonging to the sets represented by the determined centroid vectors as the plurality of n object vectors. The social-networking system 160 may determine one or more of the sets of object vectors by determining the nearest centroid vector to the query vector. The social-networking system 160 may only compare the query vector with the object vectors within those sets. Searching for the set of object vectors closest to the query vector may be based on a nearest neighbor search. In a nearest neighbor search, the goal is to retrieve the closest vectors to a target vector up to a threshold number of vectors. An alternate goal is to retrieve all vectors within a threshold distance of the target vector in the embedding space. Because the degree of match between the query vector and an object vector is reflected by the distance between the vectors in the embedding space, comparing only object vectors within the selected sets may reduce the number of object vectors to compare to the query vector without sacrificing accuracy. Continuing with the example of FIG. 5, the social-networking system 160 has received a query and determined a query vector 540. The social-networking system 160 accesses the plurality of objects represented by the object vectors 510 within the embedding space 500. The social-networking system 160 compares the distances from the query vector 540 to each centroid vector 520a, 520b, and 520c. The social-networking system 160 determines that the query vector 540 is closest to centroid vector 520b. The social-networking system 160 identifies the plurality of object vectors 510 associated with the partition 530b as the object vectors to be compared for retrieval. In particular embodiments, the social-networking system 160 may partition the object vectors based on at least an approximate nearest neighbors approach applying coarse quantization. To accurately represent complex objects, the social-networking system 160 may require very large object vectors, on the order of hundreds or thousands of dimensions. This may significantly increase the computational cost comparing the object vectors, partitioning the vectors, and computing centroid vectors. One approach to reduce the computational cost is to approximate the object vectors through an approach such as coarse quantization. Using an approximation of the vectors and applying the partitioning techniques described above is called an approximate nearest neighbors search. More about approximate nearest neighbors searching and coarse quantization may be found in U.S. patent application Ser. No. 15/393,926, filed 29 Dec. 2016, which is incorporated by reference. Although this disclosure describes accessing a collection of vectors in a particular manner, this disclosure contemplates accessing a collection of vectors in any suitable manner.

In particular embodiments, the social-networking system 160 may determine which objects to return in response to the query based on the calculation of an inner product of the query vector and each object vector. In particular embodiments, the social-networking system 160 may calculate, for each of object vectors 1 to k of the plurality of n object vectors, a complete inner product of the query vector with the object vector, wherein object vectors 1 to k are identified as a set of top object vectors. In order to determine which of the object vectors are the best match to the query, an exhaustive search of the n object vectors must be performed, each object vector must be compared in some way. The social-networking system 160 may determine a target number of object vectors to retrieve. For example, the social-networking system 160 may determine to return k object vectors, where k may be any suitable number of object vectors to retrieve (e.g., the top 1, 3, 7, or 100 object vectors). Social-networking system 160 may calculate the inner product of the query vector and each of the first k object vectors of the plurality of object vectors. These object vectors may be stored in association with their respective inner products. Because these are the first k object vectors, these are the first k best matches to the query as determined by the social-networking system 160. This set of k vectors may be called the top vectors. Many, if not all, of the first k object vectors may be replaced in the set of top vectors during the comparison of the remaining vectors in the plurality of object vectors. Although this disclosure describes comparing vectors in a particular manner, this disclosure contemplates comparing vectors in any suitable manner.

In particular embodiments, to reduce the computational cost of comparing the inner product of the query vector with each object vector, the social-networking system 160 may calculate a bound on the value of the inner product prior to calculating the inner product. The bound may be used to determine whether to calculate the full inner product by comparing the bound to a threshold or reference value. For example, if an upper bound is guaranteed to be no less than the true value of the inner product, or if a lower bound is guaranteed to be no greater than the true value, the bound may be used to determine if it is possible for the inner product to be greater than one already calculated. If the bound is less computationally expensive to calculate than the inner product itself, using a bound may allow the social-networking system 160 to speed up retrieval by avoiding the full calculation of inner products of the query vector and select object vectors. The problem may generalized as follows: given a query vector q and an object vector v, both in $R^d$ (i.e., both vectors having d dimensions/components), compute upper and lower bounds for an inner product $\langle q|v \rangle$. In order for such bounds to be useful, the bounds should be as tight as possible and, computationally speaking, significantly cheaper than calculating the actual inner product. In particular embodiments, this problem may be addressed by making use of a set of m reference vectors, $\{c_i\}_{i=1}^m$. Reference vectors make it possible to compute the bounds on the basis of statistics about the vectors themselves, which decompose into two types: (1) those that are a function of the query and the reference vectors, and (2) those that are a function of the object vector and the reference vectors. This decomposition makes it possible to precompute these statistics, such as when the object vectors are compiled into a data store 164, and reuse them during search, minimizing computational overhead. Sharing the same set of reference vectors across many object vectors may result in significant speed ups in object retrieval. Reference vectors may be chosen arbitrarily, but the choice does impact the width of the bounds. In particular embodiments, the reference vectors may be the nearest centroid vectors to the object vector in the embedding space.

Given a set of m reference vectors $c_i$, the upper bound $h(q,v) \geq \langle q|v \rangle$ is obtained by solving the following constrained optimization problem:

$$h(q, v) = \min_{y \in R^d} -\langle q | y \rangle$$
$$\text{subject to } \langle c_i | y \rangle = \theta_i, i = 1, \ldots, m$$
$$\|y\|^2 = \|v\|^2$$

where $\{\theta_i = \langle c_i|v \rangle\}_{i=1}^m$. A lower bound $l(q,v) \leq \langle q|v \rangle$ can be obtained by $l(q,v) = h(-q, v)$ since by definition of an inner product $-\langle -q|v \rangle = \langle q|v \rangle$. Using the dot product, $\langle q|v \rangle = q^T v$, gives rise to the following instantiation of the constrained optimization problem:

$$h(q, v) = \min_{y \in R^d} -q^T y$$
$$\text{subject to } Cy = \theta$$
$$\|y\|^2 = \|v\|^2$$

where rows of matrix $C \in R^{m \times d}$ are comprised of the reference vectors $\{c_i\}_{i=1}^m$, and $\theta = (\theta_1, \ldots, \theta_m)^T$ holds the corresponding constraint values. This is a convex problem, the solution of which is given by $$h(q,v) = \sqrt{(\|q\|^2 - q^T C^T \Sigma^{-1} C q)(\|v\|^2 - \theta^T \Sigma^{-1} \theta)} + q^T C^T \Sigma^{-1} \theta$$

where $\Sigma = CC^T$.

Now, the matrix $P_C = C^T \Sigma^{-1} C$ is an orthogonal projector onto the subspace $C \subseteq R^d$ spanned by the reference vectors $\{c_i\}_{i=1}^m$ (i.e., the rows of matrix C). Since orthogonal projectors an idempotent (i.e., $P_C^2 = P_C$) and symmetric, it follows that $$v^T P_C v = v^T P_C P_C v = (P_C v)^T P_C v = \|P_C v\|^2, \forall v \in R^d,$$

For every orthogonal projector $P_C$ there exists a unique complementary orthogonal projector $Q_{C\perp} = I - P_C$ that maps vectors from $R^d$ onto the complementary orthogonal subspace $C^\perp$. Consequently every vector $v \in R^d$ can be uniquely resolved into a sum of two orthogonal vectors $v = v_C + v_{C\perp}$ where:

$$v_C = P_C v \in C, v_{C\perp} = Q_{C\perp} v \in C^\perp, \text{ and } v_C^T v_{C\perp} = 0.$$

Due to orthogonality of the subspaces C and $C^\perp$, the inner product between any two vectors q, $v \in R^d$ can be written as $$q^T v = (q_C + q_{C\perp})^T (v_C + v_{C\perp}) = q_C^T v_C + q_{C\perp}^T v_{C\perp},$$

which implies that $$\|v\|^2 = v^T v = \|v_C\|^2 + \|v_{C\perp}\|^2.$$

Therefore, having knowledge of only the projections $q_C$ and $v_C$ and of norms $\|q\|$ and $\|v\|$, an upper bound on the complete inner product $q^T v$ can be obtained by employing the Cauchy-Bunyakovsky-Schwarz inequality yielding $$q^T v \leq q_C^T x_C + \|q_{C\perp}\| \|v_{C\perp}\|$$

When a single reference vector is used, the bound becomes $$h(q, v) = \sqrt{\left(\|q\|^2 - \frac{(c^T q)^2}{\|c\|^2}\right)\left(\|v\|^2 - \frac{(c^T v)^2}{\|c\|^2}\right)} + \frac{(c^T q)(c^T v)}{\|c\|^2}$$

where c is the reference vector and $c^T v$ is the corresponding constraint value. In this case the sufficient statistics for bound computations are the norm of vector c and the inner product $c^T v$ for each vector v in the plurality of n vectors. Although this disclosure describes comparing vectors in a particular manner, this disclosure contemplates comparing vectors in any suitable manner.

Using the notion of the bounds described above, we now develop a nearest neighbor search algorithm (Algorithm 1, below) that minimizes the number of full inner product evaluations required during search while guaranteeing zero loss in search accuracy. The algorithm relies on an intuition that inner product bounds are much cheaper to compute than the full inner products, especially when vectors are high-dimensional.

| Algorithm 1 Nearest Neighbor Search with Bounds |
|---|
| 1. Initialize once: Choose a set of reference vectors for each database vector |
| 2.     For each set of reference vectors compute the inverse of the covariance matrix $\Sigma$. |
| 3.     For each object vector v, compute the inner product $\{\langle c_i|v\rangle\}_{i=1,m}$ with the reference vectors $\{c_i\}_{i=1}^m$. |
| 4. Input: query vector q, number K of highest-scoring results to return. |
| 5. Initialize: a min-heap H with capacity equal to K ; an iterator I over a set of vectors. |
| 6. while I has next element do |
| 7.     Get the next object vector v from iterator I |
| 8.     if size of heap H is less than K then |
| 9.         Compute the inner product $\langle q|v \rangle$, use as the key for vector v, and insert the pair ($\langle q|v \rangle$, v), into heap H |
| 10.         goto line 7 |
| 11.     end if |
| 12.     Compute the upper bound h(q, v) |
| 13.     if h((q, v) ≥ min key in heap H then |
| 14.         Compute the inner product $\langle q|v \rangle$ |
| 15.         if $\langle q|v \rangle$ ≥ min key in heap H then |
| 16.             Remove an element with the min key from heap H |

| Algorithm 1 Nearest Neighbor Search with Bounds |
| --- |
| 17.            Insert the pair (⟨q\|v⟩, v) into heap H |
| 18.         end if |
| 19.      end if |
| 20. end while |

The algorithm takes as input a query vector q and the number K of top-scoring items to return. The algorithm requires an iterator over the database (line 3). The iterator provides a powerful abstraction that allows Algorithm 1 to be used as a meta algorithm on top of many other nearest neighbor search methods, thus speeding them up. For example, the iterator can be as simple as an exhaustive sequential scan over the database. However, the iterator can be an interface to much more powerful methods such as coarse quantization, which partitions the data space into disjoint regions and limits the exhaustive search only to items in the regions closest to the query. The algorithm relies on a min-heap (line 5) for fast access to the smallest inner product value across all vectors in the heap. Heaps in general are further discusses below. On each iteration, the algorithm maintains an invariant that the min-heap contains the top-K scoring vectors out of all seen thus far (lines 13-19). The upper bound equation described above enables the search to be significantly more efficient than brute force by preventing inner product computations with database vectors that have no chance of being among the top-K (lines 12-13). This is due to the fact that if the upper bound h(q,v) for an incoming vector v is smaller than the minimum inner product value in the heap (line 13), then there is no need to compute the inner product ⟨q|v⟩ as it is guaranteed to be smaller than the minimum in the heap. The algorithm may be further augmented by implementing the progressive computation of inner products as described herein. The algorithm is simple to implement and incurs minimal additional computational and storage costs. This makes the algorithm particularly well suited for practical industrial applications where ease of implementation and low infrastructural overhead play a fundamental role in determining whether a particular approach will see a light of day in production systems which nowadays often require low-millisecond response times.

Figure 6A:
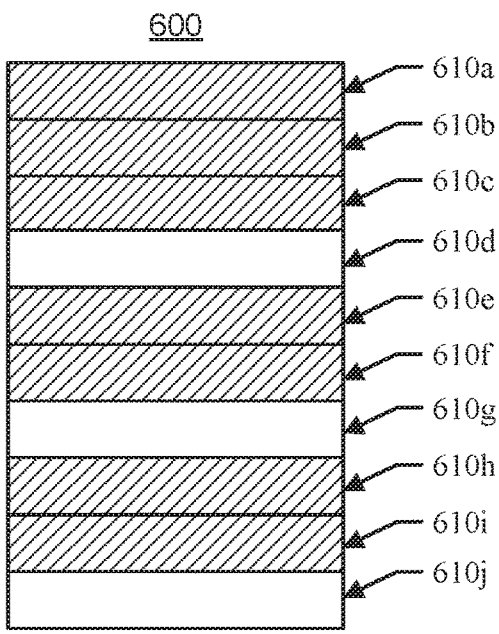
FIGS. 6A and 6B illustrate search progress through an example data set.

FIG. 6A illustrates an example showing the social-networking system 160 using a bound to determine whether to calculate an inner product while comparing a query vector to a plurality of object vectors. This example demonstrates how calculating the bound may reduce the number of inner product calculations the social-networking system 160 requires to determine the best matches among a plurality of n vectors. The social-networking system 160 receives a query and determines a query vector. The social-networking system 160 accesses a data store 164 to retrieve a set of objects. The social-networking system accesses a set of object vectors 600 corresponding to the retrieved set of objects. The set of the object vectors 600 comprises 10 object vectors 610a-610j corresponding to 10 objects that are potential responses to the query. In this example, the social-networking system 160 will retrieve 3 objects. The social-networking system 160 calculates an inner product of the query vector and each of the first 3 object vectors 610a, 610b, and 610c of the set of object vectors 600. That an inner product is calculated for an object vector 610 is noted in FIG. 6A by the filling of the box corresponding to the object vector 610. For each of the remaining seven object vectors, 610d-610j, the social-networking system 160 calculates a bound on the inner product of the query vector and the object vector. If the social-networking system 160 determines, based on the bound, that the inner product of the query vector and an object vector cannot be greater than the inner product of the query vector and one of the first 3 object vectors, 610a, 610b, and 610c, the social-networking system 160 may not calculate an inner product for the object vector. If the social-networking system 160 determines that the inner product of the query vector and object vector may be greater than the inner product of the query vector and one of the first 3 object vectors, 610a, 610b, and 610c, the social-networking system 160 calculates the inner product. To maintain the set of objects to be returned as the best matches, if a calculated inner product is greater than an inner product calculated for one of the first three object vectors, the social-networking system 160 may replace the corresponding object vector with the object vector as one of the threshold "best" matches.

The social-networking system 160 calculates a bound on the inner product of the query vector and the object vector 610d. The social-networking system 160 determines, based on the bound, that the inner product of the query vector and the object vector 610d cannot be greater than the inner product calculated between the query vector and one of object vectors 610a, 610b, and 610c. The social-networking system 160 does not calculate the inner product of the query vector and the object vector 610d, and moves to the next object vector 610e. The social-networking system 160 calculates a bound on the inner product of the query vector and the object vector 610e and determines that the inner product may be greater than an inner product calculated for one of the object vectors 610a, 610b, and 610c. The social-networking system 160 therefore calculates the complete inner product of the query vector and the object vector 610e. The social-networking system 160 compares the complete inner product to the inner product calculated for object vectors 610a, 610b, and 610c, and determines that the complete inner product is not greater than any of the inner products. The social-networking system 160 moves on to the next object vector. The social-networking system 160 continues in this way: calculating a bound, skipping the inner product calculation, and comparing complete inner products for each object vector 610f-610j of the accessed set of object vectors 600. Based on the calculated bounds, the social-networking system 160 is able to skip the complete inner product calculation between the query vector and object vectors 610g and 610j. Combined with the skip of object vectors 610d, the social-networking system 160 is able to compare the relative inner products of the query vector and each object vector of the accessed set of object vectors 600 to each other inner product, without calculating each complete inner product. This amounts to 30% fewer inner product calculations for this simple example. Although this disclosure describes identifying vectors matching a query in a particular manner, this disclosure contemplates identifying vectors matching a query in any suitable manner.

In particular embodiments, the social-networking system 160 may further reduce the cost and complexity of comparing a query vector to a plurality of n object vectors by computing each inner product progressively. Progressively computing an inner product comprises calculating a plurality of inner products over sub-vectors comprising equal subsets of the respective components of each vector (i.e., a "partial inner product"). A sub-vector is a vector composed of a subset of the components of a vector. To progressively compute the inner product of two vectors, the order of the sub-vectors must be maintained so that like components of each vector are compared. This disclosure will refer to an inner product using less than every component of two vectors as a partial inner product of the two vectors. A complete inner product is an inner product using each and every component of the vectors. A complete inner product may be the result of a combination of partial inner products. For example, the inner product of two vectors $\langle q|v \rangle$, where q and v comprise d components such that $q=q_1+q_2+\ldots q_d$ and $v=v_1+v_2+v_d$ using the dot product q·v can be calculated as $\langle q|v \rangle = \Sigma_{i=1}^{k} q_i v_i + \Sigma_{i=k+1}^{d} q_i v_i$, where $1<k<d$. Any number of partial inner products can be calculated and combined to compute the complete inner product. In particular embodiments, after calculating the complete inner product for each of object vectors 1 to k of the plurality of n object vectors, the social-networking system 160 may compute, for each of object vectors k+1 to n of the plurality of n object vectors, an estimated inner product of the query vector with each object vector, wherein the estimated inner product is computed progressively using one or more partial inner products. Although this disclosure describes comparing vectors in a particular manner, this disclosure contemplates comparing vectors in any suitable manner.

In particular embodiments, the social-networking system 160 may check whether to calculate a first partial inner product by calculating a bound on the estimated inner product of the query vector and the object vector. If the calculated bound is less than the minimum inner product associated with the set of top object vectors, the social-networking system 160 may terminate the computing of the estimated inner product of the query vector with the object vector. The social-networking system 160 may calculate a bound on the inner product to determine whether it is possible for the inner product to be greater than one of the top object vectors. In particular embodiments, the bound may be based on one or more reference vectors, such as the centroid vectors closest to the query vector in the embedding space. Other convenient reference vectors may be used, so long as they can meet the requirements of the bound calculation described herein. The bound may be determined by an algorithm comprising the formulas discussed above, e.g., the bound $h(q,v) > \langle q|v \rangle$ may be an upper bound calculated using the formula $$h(q,v) = \sqrt{\left(\|q\|^2 - \frac{(c^T q)^2}{\|c\|^2}\right)\left(\|v\|^2 - \frac{(c^T v)^2}{\|c\|^2}\right)} + \frac{(c^T q)(c^T v)}{\|c\|^2}$$

using only a single reference vector c. In particular embodiments, additional reference vectors may be used. If, using the calculated bound, the social-networking system 160 determines that the inner product for a given object vector cannot be greater than a minimum inner product associated with a vector of the set of top vectors, then the social-networking system 160 may skip computing the complete inner product entirely with respect to said object vector. If the social-networking system 160 determines that the inner product may be greater than a minimum inner product associated with a vector of the set of top vectors, then the social-networking system 160 may continue to progressively compute the complete inner product by calculating the first partial inner product of the query vector and the object vector. Although this disclosure describes comparing vectors in a particular manner, this disclosure contemplates comparing vectors in any suitable manner.

In particular embodiments, the social-networking system 160 may calculate the first partial inner product of the query vector and the object vector. The query vector may comprise d components and each object vector may comprise d components, (i.e., vectors q, $v \in R^d$). A vector may be divided into a plurality of sub-vectors comprising a subset of the components of that vector. As an example, a query vector $q=q_1+q_2+\ldots+q_d$ may be divided into two query sub-vectors $q_a=q_1+q_2+\ldots+q_j$ and $q_b=q_{j+1}+q_{j+2}+\ldots q_d$, where $1<j<d$. Note that a query vector may be divided into up to d query sub-vectors as required. Similarly, an object vector may be divided into object sub-vectors. The social-networking system 160 may calculate the first partial inner product as an inner product of a query sub-vector comprising components 1 to j of the d components of the query vector with an object sub-vector comprising components 1 to j of the d components of the object vector. As an example and not by way of limitation, the query and object vector may be partitioned into two parts: $q=(q',q'')^T$ and $v=(v', v'')^T$, where q', $v' \in R^k$ and q'', $v'' \in R^{(d-k)}$. The inner product $q^T v$ decomposes into two components $q^T v = q'^T v' + q''^T v''$. The social-networking system 160 may calculate the first partial inner product $q'^T v'$. As an example, and not by way of limitation, the query vector and the object vector may each comprise one hundred components. The first partial inner product may comprise an inner product of the first ten components of each vector. Although this disclosure describes calculating an inner product of two vectors in a particular manner, this disclosure contemplates calculating an inner product of two vectors in any suitable manner.

In particular embodiments, the social-networking system 160 may calculate an updated bound on the estimated inner product. To calculate the updated bound on the estimated inner product, the social-networking system 160 may calculate a bound on the remaining inner product, the portion of the inner product not covered by the first partial inner product. After the first partial inner product, the remaining inner product will encompass an inner product of a query sub-vector comprising components j+1 to d of the d components of the query vector with an object sub-vector comprising components j'+1 to d of the d components of the object vector. The social-networking system 160 may combine the first partial inner product with the calculated bound on the remaining inner product to calculate the updated bound on the estimated inner product. Just as an inner product calculation can be decomposed into a plurality of inner products over sub-vectors, the bound on the inner product may be decomposed into constituent parts. Similarly to how the inner product $q^T v$ decomposes into two components $q^T v = q'^T v' + q''^T v''$, the matrix C described above may be partitioned column-wise as $C_{n \times d} = (C'_{n \times k} | C''_{n \times (d-k)})$. Substituting this into the equations described above using q'' and v'' in place of q and v and using C'' instead of the full matrix C gives an equation for the upper bound on the remaining inner product:

$$h(q'',v'') = \|q''_{C^\perp}\| \|x''_{C^\perp}\| + q''^T_C v''_C,$$

where $C \subseteq R^{d-k}$ refers to the subspace spanned by the rows of C'' and $C^\perp \subseteq R^{d-k}$ is the corresponding orthogonal complimentary subspace. Therefore, the bound for the estimated inner product can be calculated as $$q^T v \leq q'^T v' + h(q'',v'') \leq h(q,x).$$

Based on this updated bound, the social-networking system 160 may determine whether to calculate one or more subsequent partial inner products. As an example and not by way of limitation, each vector may comprise one hundred components. The first partial inner product of the query vector and object vector may have comprised the first ten components of each vector. The calculated bound on the remaining inner product will comprise a bound on the inner product of the remaining ninety components. The combination of the calculated inner product of the first ten components and the calculated bound on the inner product of the remaining ninety components will be the updated bound on the estimated inner product. Although this disclosure describes calculating an inner product bound in a particular manner, this disclosure contemplates calculating an inner product bound in any suitable manner.

In particular embodiments, the social-networking system 160 may calculate one or more subsequent partial inner products. Each subsequent partial inner product may be calculated if an updated bound on the estimated inner product, calculated with each subsequent partial inner product, is greater than the minimum inner product associated with the set of top object vectors. The social-networking system 160 may stop calculating subsequent partial inner product when a complete inner product of the object vector and the query vector is computed, or when the progressive computation is otherwise terminated. After calculating a first partial inner product, the inner product of the query vector and the object vector is known up to the jth component A subsequent partial inner product may be an inner product of a query sub-vector comprising components 1 to j' of the d components of the query vector with an object sub-vector comprising components 1 to j' of the d components of the object vector, wherein j'>j. As an example, a subsequent partial inner product may be calculated as an inner product of a query sub-vector comprising components j to j' of the components of the query vector and an object sub-vector comprising j to j' of the components of the object vector. This subsequent partial inner product may be added to the first partial inner product to calculate the partial inner product over components 1 to j' of the respective vectors. Stated otherwise: the query and object vectors may be partitioned into parts: $q=(q',q'',q''')^T$ and $v=(v',v'',v''')^T$, where $q', v' \in R^j$, $q'',v'' \in R^{(j'-j)}$, and $q''',v''' \in R^{(d-j')}$. The inner product $q^T v$ decomposes into three components $q^T v = q'^T v' + q''^T v'' + q'''^T v'''$. The component $q'^T v'$ is the first partial inner product and the component $q''^T v''$ is the subsequent partial inner product. The third component $q'''^T v'''$ is the remaining inner product left to still be calculated. The social-networking system 160 may calculate a bound on a remaining inner product. The remaining inner product is the inner product of a query sub-vector comprising components j'+1 to d of the d components of the query vector with an object sub-vector comprising components j'+1 to d of the d components of the object vector. The social-networking system 160 may calculate an updated bound on the estimated inner product based on the subsequent partial inner product and the bound on the remaining inner product. The updated bound may be calculated according to the equations described above. If the updated bound is less than the minimum inner product associated with the set of top object vectors, the social-networking system 160 may terminate the computing of the estimated inner product of the query vector with the object vector. Otherwise, the social-networking system 160 may set j equal to j' and calculate an additional subsequent inner product.

In particular embodiments, the social-networking system 160 may advance the calculation to another subset of components of the remaining inner product and perform the steps of calculating a subsequent partial inner product again. The selection of the next subset of components may be determined or preset in advance, or determined by the social-networking system 160 as the process continues. As an example, and not by way of limitation, the social-networking system 160 may calculate a set percentage, e.g., 10%, or fixed number of components, of the partial inner product between a query vector and an object vector with each subsequent partial inner product. In particular embodiments, the social-networking system 160 may adapt the size of the subset to be calculated based on the data. The social-networking system may calculate a first subset of a first size based on a determination that the first size is sufficient to indicate whether to calculate a first partial inner product. Subsequent partial inner products may be of varying sizes based on a determination of subsequent additional value. As an example and not by way of limitation, the social-networking system 160 may calculate a first partial inner product comprising the first 40% of the components of the query vector and the object vector. The social-networking system 160 may designate, for each subsequent partial inner product that 10% of the remaining components should be used. In particular embodiments, the social-networking system 160 may continue to calculate subsequent partial inner products and updated bounds until it detects that the complete inner product has been computed. As an example and not by way of limitation, the social-networking system 160 may determine that the complete inner product of the object vector and the query vector is computed when j' is equal to d. Once the calculation of the partial inner products advances such that a partial inner product of each component of the query vector and each like component of the object vector has been calculated, the complete partial inner product may be calculated as a combination of these partial inner products. Although this disclosure describes calculating an inner product of vectors in a particular manner, this disclosure contemplates calculating an inner product of vectors in any suitable manner.

Figure 6B:
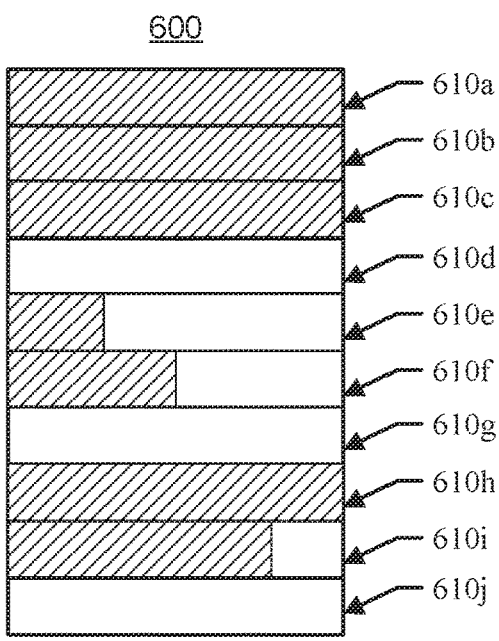

FIG. 6B illustrates an example showing the social-networking system 160 using partial inner products and an updating bound to compare a query vector to a plurality of object vectors. This example demonstrates how the use of the updating bound may further reduce the number of calculations required by the social-networking system 160 to determine the best matches among the plurality of n object vectors. The social-networking system 160 receives a query and determines a query vector. The social-networking system 160 accesses a data store 164 to retrieve a set of objects. The social-networking system 160 accesses a set of object vectors 600 corresponding to the retrieved set of objects. The accessed set of object vectors 600 comprises ten object vectors 610a-610j corresponding to ten objects that are potential responses to the query. In this example, the social-networking system 160 will respond to the query with three objects. The social-networking system 160 calculates an inner product of the query vector and each of the first 3 object vectors 610a, 610b, and 610c of the accessed set of object vectors 600. That an inner product is calculated for an object vector 610a-610j is noted in FIG. 6B by the filling of the box corresponding to the object vector 610a-610j. For each of the remaining seven object vectors 610d-610j of the accessed set of object vectors 600, the social-networking system 160 calculates a bound on the inner product of the query vector and the object vector. If the social-networking system 160 determines, based on the bound, that the inner product of the query vector and an object vector cannot be greater than the inner product of the query vector and one of the first 3 object vectors, 610a, 610b, and 610c, the social-networking system 160 may not calculate an inner product using said object vector. If the social-networking system 160 determines that the inner product of the query vector and object vector may be greater than the inner product of the query vector and one of the first 3 object vectors, 610a, 610b, and 610c, the social-networking system 160 progressively computes the inner product. To keep the set of objects to be returned accurate, if a calculated inner product is greater than an inner product calculated for one of the first 3 object vectors, the social-networking system 160 may replace the corresponding object vector with the object vector as one of the threshold "best" matches.

The social-networking system 160 calculates a bound on the estimated inner product of the query vector and the object vector 610d to check whether to calculate a first partial inner product of the query vector and object vector 610d. The social-networking system 160 determines, based on the bound, that the inner product of the query vector and the object vector 610d cannot be greater than the inner product calculated between the query vector and one of object vectors 610a, 610b, and 610c. The social-networking system 160 does not calculate a first partial inner product of the query vector and the object vector 610d, and moves to the next object vector 610e.

The social-networking system 160 calculates a bound on the estimated inner product of the query vector and the object vector 610e to check whether to calculate a first partial inner product. The social-networking system 160 determines that the inner product may be greater than an inner product calculated for one of the object vectors 610a, 610b, and 610c. The social-networking system 160 therefore calculates the first partial inner product of the query vector and the object vector 610e. That a partial inner product has been calculated between the query vector and a given object vector is denoted by filling a portion of the box corresponding to the object vector. The social-networking system 160 calculates a bound on the remainder of the inner product and compares a combination of the first partial inner product and the remaining inner product to calculate an updated bound on the estimated inner product of the query vector and the object vector 610e. The social-networking system 160 compares the updated bound on the estimated inner product to the inner product calculated for object vectors 610a, 610b, and 610c, and determines that the estimated inner product cannot greater than any of the inner products. The social-networking system 160 moves on to the next object vector 610f.

The social-networking system 160 checks whether to calculate the first partial inner product of the query vector and object vector 610f. Based on a calculated bound on the inner product, the social-networking system 160 calculates a first partial inner product. The social-networking system 160 calculates the bound on the remaining inner product of the query vector and object vector 610f. Based on the combination of the first partial inner product and the bound on the remaining inner product, the social-networking system 160 calculates an updated bound on the estimated inner product of the query vector and the object vector 610f. The social-networking system 160 checks whether to calculate a subsequent partial inner product by comparing the updated bound on the estimated inner product to the inner products calculated between the query vector and each of object vectors 610a, 610b, and 610c. The social-networking system 160 determines, based on the updated bound, that the inner product of the query vector and the object vector 610f may be greater than one of the previously calculated inner products. The social-networking system 160 calculates the subsequent partial inner product of the query vector and the object vector 610f. Again, the social-networking system 160 calculates a remaining bound and compares the updated bound on the estimated partial inner product to the previously calculated inner product. This time, the social-networking system 160 determines that the inner product of the query vector and object vector 610f cannot be greater than one of the previously calculated inner products and terminates the progressive computation. The social-networking system 160 moves on to the next query vector 610g.

The social-networking system 160 continues in this way checking whether to calculate a first partial inner product and terminating the computation for object vectors 610g and 610j. For object vector 610h, the social-networking system 160 determines to calculate more than one subsequent partial inner product of the query vector and object vector 610h. The social-networking system 160 still terminates the progressive computation prior to calculation of the complete partial inner product. For object vector 610i, the social-networking system 160 calculates enough subsequent partial inner products that the complete inner product is computed. The social-networking system 160 compares the complete inner product of the query vector and the object vector 610i to the complete inner product of the query vector and each of object vectors 610a, 610b, and 610c, respectively. The social-networking system 160 determines that the inner product of the query vector and object vector 610i is greater than the inner product of the query vector and the object vector 610b. The social-networking system 160 replaces the object vector 610b with the query vector 610i in the set of top vectors. The social-networking system 160 completes the exhaustive search, comparing the inner product calculated between the query vector and object vector 610a-610j of the set of accessed object vectors 600 and returns references to the retrieved objects corresponding to the query vectors 610a, 610c, and 610i as responses to the query. Using the progressive computation of the inner products, based on an updating bound and partial inner product calculations, the social-networking system 160 is able to complete the exhaustive search making a fraction of the inner product calculations compared to both the example in FIG. 6A and in performing a traditional exhaustive search. Although this disclosure describes comparing vectors in a particular manner, this disclosure contemplates comparing vectors in any suitable manner.

Although the techniques herein have been described using, as the inner product, the dot product definition, the techniques may be applied to variety of functions that adhere to the definition of an inner product. In particular embodiments, the inner product, first partial inner product, or each subsequent partial inner product may be a dot product of two vectors $\langle q|v \rangle = q \cdot v = q^T v$. In particular embodiments, the inner product, first partial inner product, or each subsequent partial inner product may be a norm of a difference vector between two vectors. In some situations, depending on the data or the query, the norm of the distance vector $\|q-v\|$, also known as the Euclidean distance, may be a more appropriate or convenient criterion for comparing the query vector and the object vector. The most commonly adopted definition of a vector norm in inner product spaces is the square root of the inner product of a vector with itself (i.e., the 2-norm), $\|x\| = \sqrt{\langle x|x \rangle}$. As another example and not by way of limitation, to calculate an inner product of query vector q and object vector v, the social-networking system 160 may calculate the distance vector $d_{q,v} = q-v$. The social-networking system 160 may then calculate the 2-norm of the distance vector $\|d_{q,v}\| = \sqrt{\langle q-v|q-v \rangle}$. This may be expressed as a single operation as $\|d_{q,v}\| = \sqrt{\langle q-v|q-v \rangle}$. Any other suitable definition of an inner product may be used. Although this disclosure describes calculating inner products in a particular manner, this disclosure contemplates calculating inner products in any suitable manner.

In particular embodiments, the bound on the estimated inner product h(q,v) may be an upper bound calculated by an algorithm comprising $h(q,v) \leq \|q\|\|v\|$, wherein q is the query vector, v is an object vector, and $\|q\| = \sqrt{q^T q}$. Just as there are a variety of appropriate definitions for the inner product, there are a variety of bounds that can be calculated for the estimated inner product or each updated bound of the progressive bound computation. A broadly applicable bound has been discussed above. Under certain circumstances, a simpler bound may be used. Based on specific preconditioning of the data and using domain knowledge, a bound calculation using the Cauchy-Schwarz Inequality may be used. The Cauchy-Schwarz Inequality states: for vectors q and v: $|q^T v| \leq \|q\|\|v\|$, or the value of the inner product of two vectors is less than or equal to the product of their magnitudes. This bound calculation has the advantage of being quick and simple. However, this calculation may not be appropriate under certain conditions, such as when the lengths of the vectors in the database are normalized. Although this disclosure describes calculating an inner product bound in a particular manner, this disclosure contemplates calculating an inner product bound in any suitable manner.

In particular embodiments, the approach may be augmented by calculating a lower bound instead of, or in addition to, the upper bound. The lower bound can be used on its own or in combination with the upper bound. The lower bound guarantees that the inner product of the query vector and an object vector will be above the value of the lower bound. This can be used to skip to directly calculating the complete inner product (i.e., without calculating intervening partial inner products) if the lower bound indicates the inner product of the query vector and an object vector will be greater than a minimum inner bound calculated for an object vector in the set of top object vectors. This lower bound may be calculated as part of the first check on whether to calculate a first partial inner product. The lower bound may be calculated and updated with each subsequent partial inner product, similarly to the upper bound as described above. The logic and equations for the lower bound are similar in nature to that of the upper bound. In such cases, for real-valued object vectors, the lower bound $l(q,v) < \langle q|v \rangle$ is obtained by solving the same constrained problem. Namely $$l(q,v) = h(-q,v) = \sqrt{\left(\|q\|^2 - \frac{(c^T(-q))^2}{\|c\|^2}\right) - \left(\|v\|^2 - \frac{(c^T v)^2}{\|c\|^2}\right)} + \frac{(c^T(-q))(c^T v)}{\|c\|^2},$$

since by definition of the inner product $-\langle -q|v \rangle = \langle q|v \rangle$. As an example and not by way of limitation, the social-networking system 160 may receive a query and determine a query vector for the query. The social-networking system 160 may access a plurality of object vectors corresponding to a plurality of objects, respectively. The social-networking system 160 may calculate an inner product of the query vector and a set of vectors, identified as top vectors. The social-networking system 160 may calculate an upper bound and a lower bound on the inner product of the query vector and each other object vector. If the upper bound is greater than, and the lower bound is less than, an inner product associated with one of the top vectors, the social-networking system 160 may compute a first partial inner product of the query vector and the object vector. If the upper bound is less than an inner product associated with one of the top vectors, the social-networking system 160 may move on to the next object vector. If the lower bound is greater than an inner product associated with one of the top vectors, the social-networking system 160 may calculate the inner product directly. The social-networking system 160 may follow the same procedure for each subsequent partial inner product. Although this disclosure describes calculating bounds on an inner product bound in a particular manner, this disclosure contemplates calculating bounds on an inner product bound in any suitable manner.

In particular embodiments, after computing a complete inner product, the social-networking system 160 may substitute, in the set of top object vectors, the object vector associated with the complete inner product for the object vector associated with the minimum inner product if the complete inner product is greater than the minimum inner product associated with the set of top object vectors. After progressively computing the complete inner product, the social-networking system 160 may determine whether the object vector is greater than a minimum inner product associated with an object vector of the set of top object vectors. Although this disclosure describes determining whether the object vector is greater than a minimum inner product, it should be noted that in specific implementations, the comparison may be the reverse, i.e., determining whether the inner product is a less than a maximum inner product. Because the set of top vectors correspond to the objects determined to have been the best matches detected by the social-networking system 160 thus far, the social-networking system 160 may compare the degree of the match of the object vector against all other object vectors compared thus far by looking only at the set of top object vectors. If the inner product of the query vector and object vector exceeds the minimum inner product calculated for an object vector in the set of top object vectors, the social-networking system 160 may substitute the object into the set of top object vectors, as it has been determined to be a better match. As an example and not by way of limitation, the social-networking system 160 may compute a complete inner product of a query vector and an object vector. The social-networking system 160 may maintain the inner product calculated between the query vector and each of the top object vectors. The social-networking system 160 may replace the object vector associated with the lowest inner product of the set of top object vectors with the object vector for which the complete inner product has just been calculated. In particular embodiments, the social-networking system 160 may maintain the set of top object vectors using a heap data structure. Each object vector in the set of top object vectors may be represented in the heap by the complete inner product of the query vector with the particular object vector. Items may be stored using a heap data structure as key:value tuples. The order of items according to their keys is maintained as new objects are inserted into the heap. This reduces the computational cost of determining the minimum (or maximum, as appropriate) key and the object associated with it. A heap data structure may be particularly useful where, as here, it is anticipated that the number of times the minimum key is retrieved will greatly outnumber the number of times an item will be inserted (and the heap re-ordered). Although this disclosure describes storing and comparing inner products in a particular manner, this disclosure contemplates storing and comparing inner products in any suitable manner.

In particular embodiments, the social-networking system 160 may send, to the client system 130 of the user, a set of references to the objects corresponding to the set of top object vectors, respectively. After exhaustively searching the plurality of n objects the social-networking system 160 may present the results of the query to the user. The exhaustive search is satisfied when the social-networking system 160 has considered each of the plurality of n objects, whether by calculating the complete inner product directly, progressively computing the complete inner product, or skipping or terminating the computation of the inner product based on a bound comparison. In particular embodiments, presenting the results of the query may comprise sending references to the objects corresponding to the set of top object vectors. As an example and not by way of limitation, the social-networking system 160 may send a list of web links or media links to the client system 130 of the user so that the client system 130 may present the objects to the user. Presenting the results may comprise sending instructions to the client system 130 of the user, for presenting the objects. As an example and not by way of limitation, the social-networking system 160 may provide instructions for generating and displaying the objects corresponding to the set of top object vectors. The instructions or references sent to the client system 130 may be generated according to the type of the query (e.g., search query, advertising request, content-recommendation request, etc.). Although this disclosure describes providing the results of a query in a particular manner, this disclosure contemplates providing the results of a query in any suitable manner.

Figure 7:
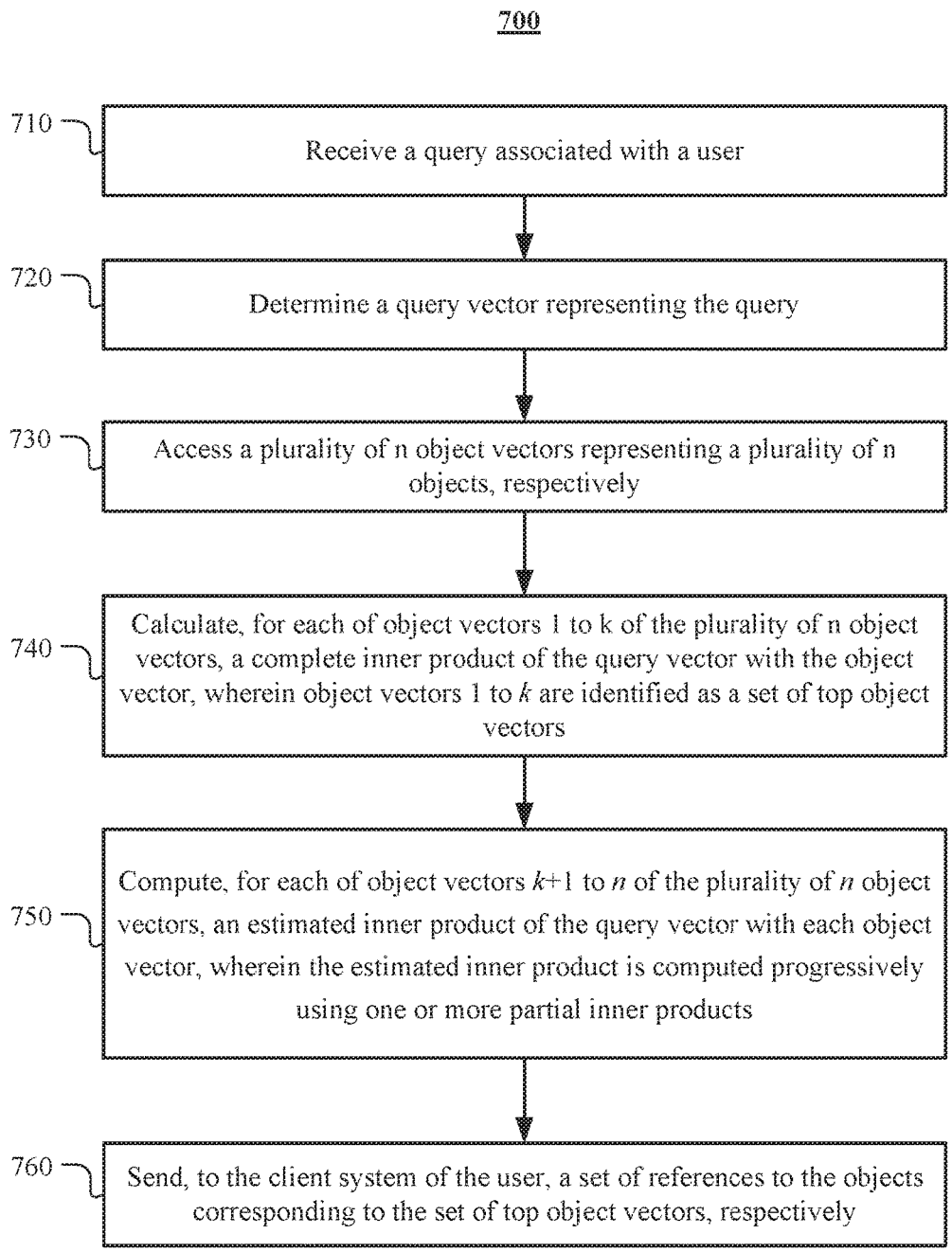
FIG. 7 illustrates an example method 700 for retrieving objects using a database of vectors based on partial inner products and a bounding calculation.

FIG. 7 illustrates an example method 700 for speeding up retrieval of objects against a database of vectors using a bounding calculation and partial inner products. The method may begin at step 710, where the social-networking system 160 may receive a query associated with a user. At step 720, the social-networking system 160 may determine a query vector representing the query. At step 730, the social-networking system 160 may access a plurality of n object vectors representing a plurality of n objects, respectively. The n objects or object vectors may be retrieved from a full data store 164, or may be accessed after a preliminary object retrieval or identification step has been performed. This preliminary object identification may comprise identifying some or all objects that may be potential matches to the query. At step 740, the social-networking system 160 may calculate, for each of object vectors 1 to k of the plurality of n object vectors, a complete inner product of the query vector with the object vector, wherein object vectors 1 to k are identified as a set of top object vectors. The set of top object vectors may be the benchmark vectors that will be designated as results to the query. The vectors in the set of top vectors may be replaced throughout the remainder of the process. At step 750, the social-networking system 160 may compute, for each of object vectors k+1 to n of the plurality of n object vectors, an estimated inner product of the query vector with each object vector, wherein the estimated inner product is computed progressively using one or more partial inner products. At step 750, the social-networking system 160 may send, to the client system 130 of the user, a set of references to the objects corresponding to the set of top object vectors, respectively.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for speeding up retrieval of objects against a database of vectors using a bounding calculation and partial inner products including the particular steps of the method of FIG. 7, this disclosure contemplates any suitable method for speeding up retrieval of objects against a database of vectors using a bounding calculation and partial inner products including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
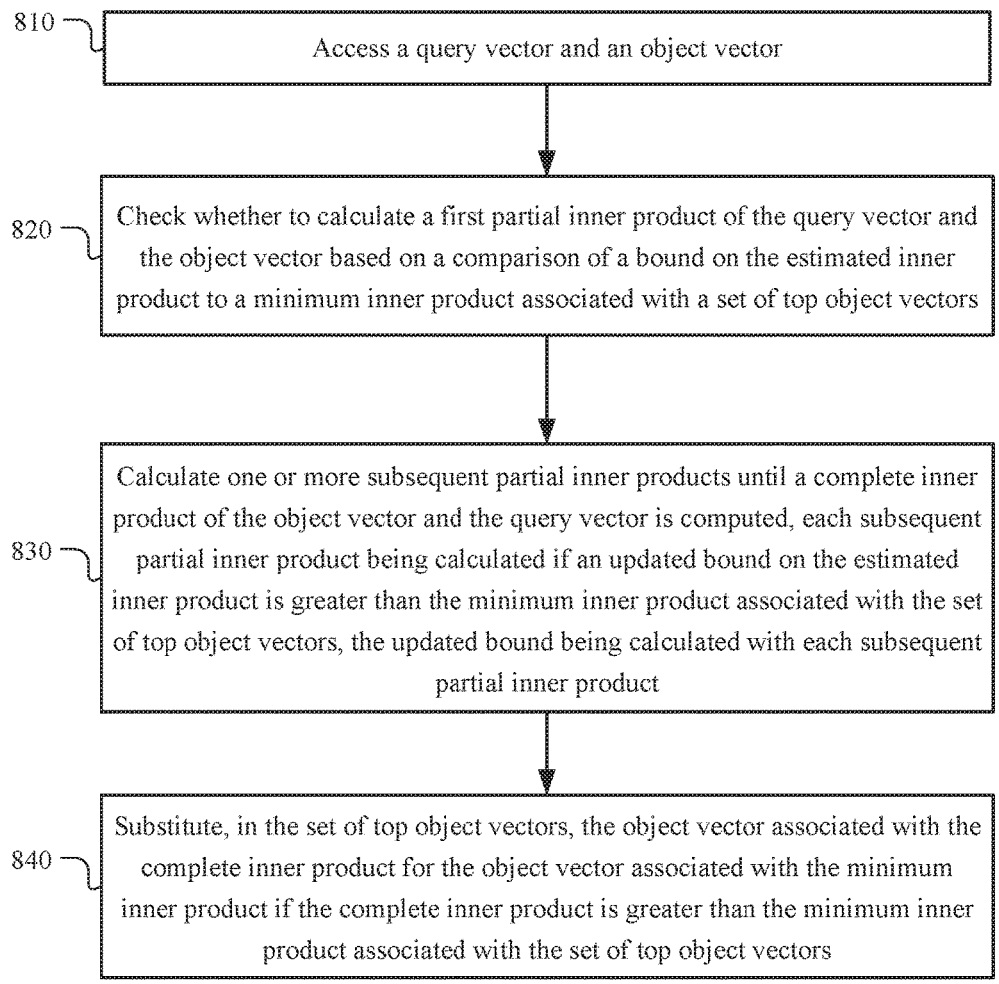
FIG. 8 illustrates an example method 800 for progressively computing an estimated inner product of a query vector with an object vector using partial inner products.

FIG. 8 illustrates an example method 800 for progressively computing an inner product of a query vector with an object vector. The method may begin at step 810, where the social-networking system 160 may access a query vector and an object vector. The social-networking system 160 may access the query vector and object vector as part of an object search or object retrieval procedure. At step 820, the social-networking system 160 may check whether to calculate a first partial inner product of the query vector and the object vector based on a comparison of a bound on the estimated inner product to a minimum inner product associated with a set of top object vectors. The bound may be an upper bound, a lower bound, or a combination of both. The social-networking system may calculate the first partial inner product. At step 830, the social-networking system 160 may calculate one or more subsequent partial inner products until a complete inner product of the object vector and the query vector is computed, each subsequent partial inner product being calculated if an updated bound on the estimated inner product is greater than the minimum inner product associated with the set of top object vectors, the updated bound being calculated with each subsequent partial inner product. At step 840, the social-networking system 160 may substitute, in the set of top object vectors, the object vector associated with the complete inner product for the object vector associated with the minimum inner product if the complete inner product is greater than the minimum inner product associated with the set of top object vectors.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for progressively computing an inner product of a query vector with each object vector of one or more object vectors including the particular steps of the method of FIG. 8, this disclosure contemplates any suitable method for progressively computing an inner product of a query vector with each object vector of one or more object vectors including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Experimental Results

Here we report the results of a benchmarking study of the proposed approach on a proprietary dataset, call it A. Dataset A comes from an online recommendation system where queries are vector embeddings representing users and the database contains vector embeddings of objects into the same inner product space. Dataset A contained 100,000 items, represented as vector embeddings. Each object vector and query vector consisted of 34 dimensions. The object retrieval problem is then to find the items corresponding to vector embeddings with the highest inner products for a given query vector. In all experiments, the search accuracy is measured by the Jaccard coefficient with the set of results returned by an exhaustive search against the entire database, averaged over queries. Performance is measured relative to the standard coarse quantization approach as it is a stronger baseline than the exhaustive search against the entire database. Search efficiency is evaluated based on the number of full inner product computations in order to make the evaluations independent of extraneous factors such as efficiency of software implementation and hardware profiles that drastically impact time-based metrics such as latency.

Figure 9C:
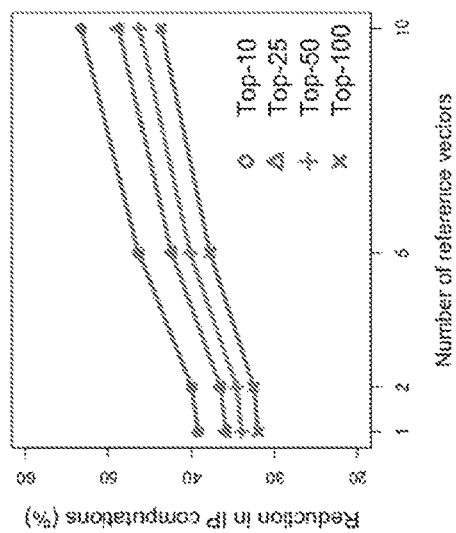
FIGS. 9A-9C illustrate results of empirical tests of the techniques described herein.
Figure 9B:
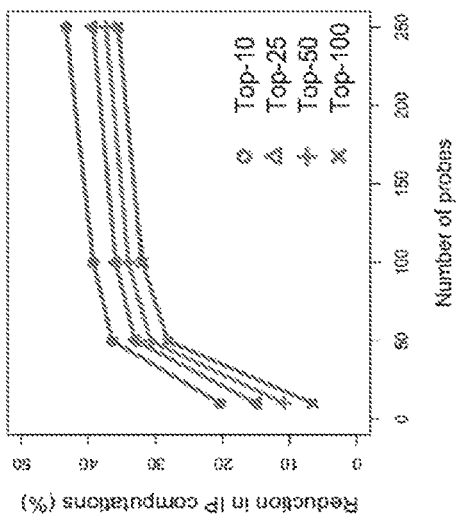
Figure 9A:
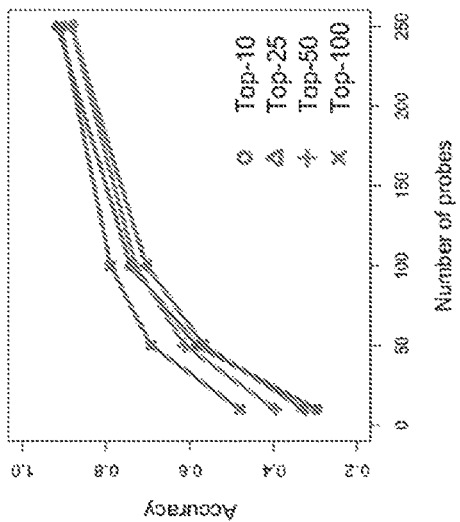

FIGS. 9A-9C show results of 2000 queries of dataset A across a range of sizes of the top-scoring vectors to be returned. FIG. 9A shows that search accuracy of the baseline coarse quantization method increases monotonically with increasing number of subsets of the dataset considered (i.e., "probes" of the dataset). This is expected since increasing the number of probes leads to an increase in the number of database vectors being considered during search. The approach described herein consistently achieves 100% agreement with coarse quantization and therefore achieves the same search accuracy.

As can be seen in FIG. 9B, relative reduction in the number of inner product computations due to the approach described herein increases with increasing number of probes. This is not a coincidence and is due to search sequence across clusters being based on an ordering by decreasing inner product of the query with cluster centroids. As the search progresses to clusters with lower inner products, the upper bounds for vectors in the cluster tend to decrease thereby minimizing the likelihood of triggering an inner product computation with the query. This reduces the number "false positive" inner product computations. For example, at 250 probes, top-10 results and just one reference vector (centroid of the nearest cluster) per data point, the approach described herein achieves an average speed up of roughly 1.8× over the baseline coarse quantization method, with 90% of queries experiencing speed ups in the 1.4× to 2.9× range. All of this is with zero loss in accuracy relative to the baseline coarse quantization method.

As the number of reference vectors increases, bounds shrink towards the exact value of the inner product. Tighter bounds in turn lead to a decrease in the number of inner product computations triggered during search, as demonstrated in FIG. 9C. However, this comes at a cost of increasing computational complexity of bound evaluations. In practice, an optimal configuration can be found by increasing the number of reference vectors to the point at which the overall (average or a given quantile of) search latency stops decreasing. Having the number of reference vectors be an adjustable parameter is therefore a desirable property of the approach described herein as it allows a user or administrator to fine-tune the system for optimal performance in practical applications by finding a setting that maximizes the overall computational efficiency of an object retrieval system based on the methods and techniques described herein.

Advertising

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 160. In addition or as an alternative, the social action may be promoted outside or off of social-networking system 160, where appropriate. In particular embodiments, a page may be an on-line presence (such as a webpage or website within or outside of social-networking system 160) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 160. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. For example, an advertisement may display information about a friend of the user within social-networking system 160 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 160 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 160.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

Systems and Methods

Figure 10:
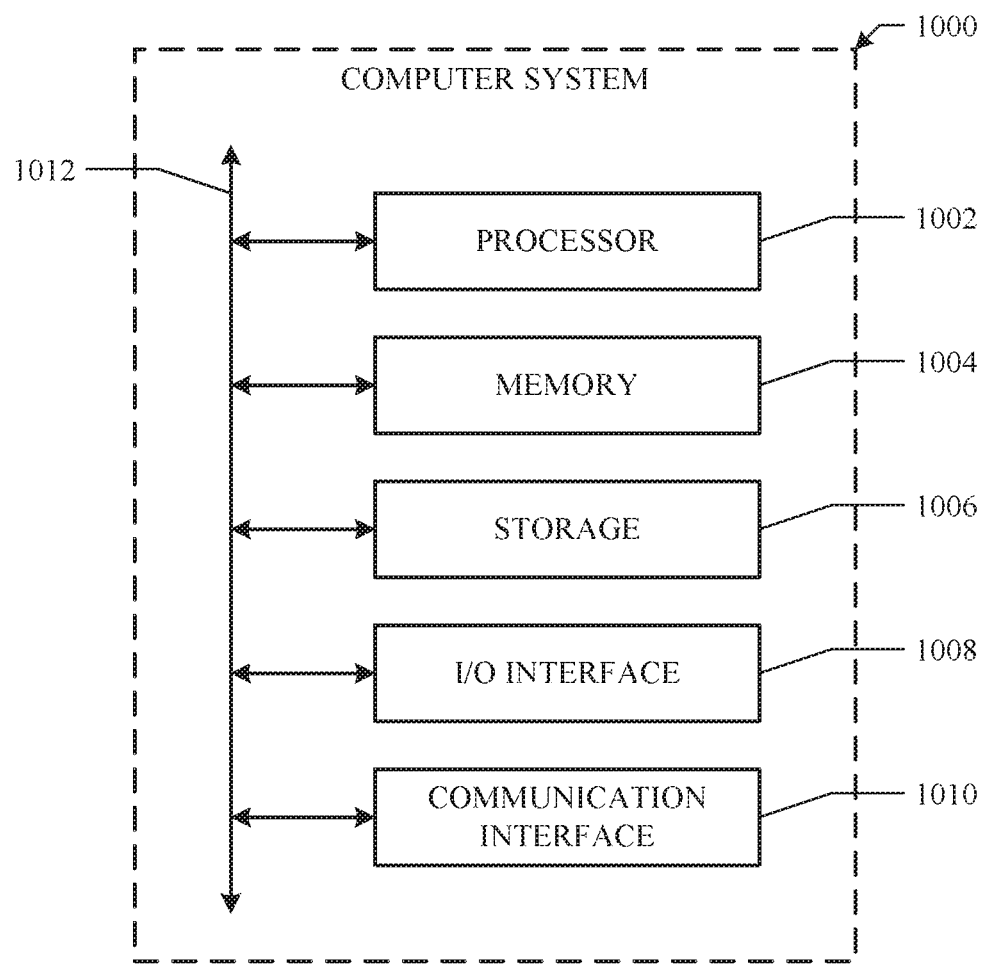
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:

receiving a query associated with a user;

determining a query vector representing the query;

accessing a plurality of n object vectors representing a plurality of n objects, respectively;

calculating, for each of object vectors 1 to k of the plurality of n object vectors, a complete inner product of the query vector and the object vector, wherein object vectors 1 to k are identified as a set of top object vectors;

computing, for each of object vectors k+1 to n of the plurality of n object vectors, an estimated inner product of the query vector and each object vector, wherein the estimated inner product is computed progressively using one or more partial inner products by:

checking whether to calculate a first partial inner product based on a comparison of a bound on the estimated inner product to a minimum inner product associated with the set of top object vectors;

calculating one or more subsequent partial inner products until a complete inner product of the query vector and the object vector is computed, each subsequent partial inner product being calculated if an updated bound on the estimated inner product is greater than the minimum inner product associated with the set of top object vectors, the updated bound being calculated with each subsequent partial inner product; and substituting, in the set of top object vectors, the object vector associated with the complete inner product for the object vector associated with the minimum inner product if the complete inner product is greater than the minimum inner product associated with the set of top object vectors; and sending, to the client system of the user, a set of references to the objects corresponding to the set of top object vectors, respectively.

2. The method of claim 1, wherein accessing a plurality of n object vectors representing a plurality of n objects comprises:

identifying a plurality of n objects matching the query; and retrieving a plurality of n object vectors corresponding to the plurality of n objects, respectively.

3. The method of claim 1, wherein checking whether to calculate the first partial inner product based on a comparison of a bound on the estimated inner product to a minimum inner product associated with the set of top object vectors comprises:

calculating a bound on the estimated inner product of the query vector and the object vector; and if the calculated bound is less than the minimum inner product associated with the set of top object vectors, terminating the computing of the estimated inner product of the query vector and the object vector.

4. The method of claim 1, wherein:

the query vector comprises d components;

each object vector comprises d components; and the first partial inner product is an inner product of a query sub-vector comprising components 1 to j of the d components of the query vector and an object sub-vector comprising components 1 to j of the d components of the object vector.

5. The method of claim 4, wherein calculating one or more subsequent partial inner products comprises:

calculating a subsequent partial inner product of the query vector and the object vector, the subsequent partial inner product being an inner product of a query sub-vector comprising components 1 to j' of the d components of the query vector and an object sub-vector comprising components 1 to j' of the d components of the object vector, wherein j' is greater than j;

calculating a bound on a remaining inner product, the remaining inner product being an inner product of a query sub-vector comprising components j'+1 to d of the d components of the query vector and an object sub-vector comprising components j'+1 to d of the d components of the object vector;

calculating an updated bound on the estimated inner product based on the subsequent partial inner product and the bound on the remaining inner product; and if the updated bound is less than the minimum inner product associated with the set of top object vectors, terminating the computing of the estimated inner product of the query vector with the object vector;

else, setting j equal to j'; and calculating an additional subsequent inner product.

6. The method of claim 5, wherein the complete inner product of the object vector and the query vector is computed when j' is equal to d.

7. The method of claim 1, wherein:

the query is a search query received from the user; and the plurality of n objects are n search results matching the search query, respectively.

8. The method of claim 1, wherein:

the query is a content-recommendation request associated with the user responsive to the user requesting to access a communication channel of an online social network; and the plurality of n objects are n recommended content objects receivable by the user through the communication channel, respectively.

9. The method of claim 1, wherein:

the query is an advertising request associated with the user; and the plurality of n objects are n advertisements receivable by the user at a client system of the user, respectively.

10. The method of claim 1, wherein the plurality of n objects comprise one or more of:

a digital media item;

an application;

an event;

a location;

a page;

an advertisement; or an external webpage.

11. The method of claim 1, wherein the inner product, first partial inner product, or each subsequent partial inner product is a dot product of two vectors.

12. The method of claim 1, wherein the inner product, first partial inner product, or each subsequent partial inner product is a norm of a difference vector between two vectors.

13. The method of claim 1, wherein the bound on the estimated inner product h(q,v) is an upper bound calculated by an algorithm comprising:

$h(q,v) \leq \|q\|\|v\|$, wherein:

q is the query vector;

v is an object vector; and $\|q\| = \sqrt{q^T q}$.

14. The method of claim 1, wherein the bound on the estimated inner product h(q,v) is an upper bound calculated by an algorithm comprising:

$$h(q, v) = \sqrt{\left(\|q\|^2 - \frac{(c^T q)^2}{\|c\|^2}\right)\left(\|v\|^2 - \frac{(c^T v)^2}{\|c\|^2}\right)} + \frac{(c^T q)(c^T v)}{\|c\|^2},$$

wherein:

q is the query vector;

v is an object vector;

c is a reference vector; and $\|q\| \leq \sqrt{q^T q}$.

15. The method of claim 1, wherein accessing a plurality of n object vectors representing a plurality of n objects comprises:

partitioning the plurality of n object vectors into a plurality of disjoint sets, each set being represented by a centroid vector;

determining one or more centroid vectors of the plurality of centroid vectors having an inner product with the query vector satisfying a threshold value; and identifying the object vectors belonging to the sets represented by the determined centroid vectors as the plurality of n object vectors.

16. The method of claim 15, wherein the object vectors are partitioned based on at least an approximate nearest neighbors approach applying coarse quantization.

17. The method of claim 1, wherein the set of top object vectors is maintained as a heap, each object vector in the set of top object vectors represented in the heap by the complete inner product of the query vector with the object vector.

18. The method of claim 1, wherein calculating one or more subsequent partial inner products comprises:

calculating a complete inner product of the query vector and the object vector if a lower bound on the estimated inner product is greater than the minimum inner product associated with the set of top object vectors, the lower bound being calculated with each subsequent partial inner product.

19. One or more computer-readable non-transitory storage media embodying software that is operable when executed to:
receive a query associated with a user;
determine a query vector representing the query;
access a plurality of n object vectors representing a plurality of n objects, respectively;
calculate, for each of object vectors 1 to k of the plurality of n object vectors, a complete inner product of the query vector and the object vector, wherein object vectors 1 to k are identified as a set of top object vectors;
compute, for each of object vectors k+1 to n of the plurality of n object vectors, an estimated inner product of the query vector and each object vector, wherein the estimated inner product is computed progressively using one or more partial inner products by:
check whether to calculate a first partial inner product based on a comparison of a bound on the estimated inner product to a minimum inner product associated with the set of top object vectors;
calculate one or more subsequent partial inner products until a complete inner product of the query vector and the object vector is computed, each subsequent partial inner product being calculated if an updated bound on the estimated inner product is greater than the minimum inner product associated with the set of top object vectors, the updated bound being calculated with each subsequent partial inner product; and
substitute, in the set of top object vectors, the object vector associated with the complete inner product for the object vector associated with the minimum inner product if the complete inner product is greater than the minimum inner product associated with the set of top object vectors; and
send, to the client system of the user, a set of references to the objects corresponding to the set of top object vectors, respectively.

20. A system comprising: one or more processors; and a non-transitory memory coupled to the processors comprising instructions executable by the processors, the processors operable when executing the instructions to:
receive a query associated with a user;
determine a query vector representing the query;
access a plurality of n object vectors representing a plurality of n objects, respectively;
calculate, for each of object vectors 1 to k of the plurality of n object vectors, a complete inner product of the query vector and the object vector, wherein object vectors 1 to k are identified as a set of top object vectors;
compute, for each of object vectors k+1 to n of the plurality of n object vectors, an estimated inner product of the query vector and each object vector, wherein the estimated inner product is computed progressively using one or more partial inner products by:
check whether to calculate a first partial inner product based on a comparison of a bound on the estimated inner product to a minimum inner product associated with the set of top object vectors;
calculate one or more subsequent partial inner products until a complete inner product of the query vector and the object vector is computed, each subsequent partial inner product being calculated if an updated bound on the estimated inner product is greater than the minimum inner product associated with the set of top object vectors, the updated bound being calculated with each subsequent partial inner product; and
substitute, in the set of top object vectors, the object vector associated with the complete inner product for the object vector associated with the minimum inner product if the complete inner product is greater than the minimum inner product associated with the set of top object vectors; and
send, to the client system of the user, a set of references to the objects corresponding to the set of top object vectors, respectively.

\* \* \* \* \*